US012197790B2

(12) United States Patent
Nelson

(10) Patent No.: US 12,197,790 B2
(45) Date of Patent: Jan. 14, 2025

(54) DATA RECOVERY TECHNIQUES USING CLOUD CONSISTENCY GROUPS

(71) Applicant: Oracle International Corporation, Redwood Shores, CA (US)

(72) Inventor: Steven Boyd Nelson, Seattle, WA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/166,992

(22) Filed: Feb. 9, 2023

(65) Prior Publication Data

US 2024/0272834 A1    Aug. 15, 2024

(51) Int. Cl.
*G06F 3/06* (2006.01)
*G06F 11/07* (2006.01)

(52) U.S. Cl.
CPC ............ *G06F 3/0665* (2013.01); *G06F 3/064* (2013.01); *G06F 3/067* (2013.01); *G06F 11/0793* (2013.01); *G06F 3/0604* (2013.01)

(58) Field of Classification Search
CPC ........ G06F 3/0665; G06F 3/064; G06F 3/067; G06F 11/0793; G06F 3/0604
See application file for complete search history.

(56) References Cited

U.S. PATENT DOCUMENTS

| 8,336,056 | B1 | 12/2012 | Gadir |
| 8,548,949 | B2 | 10/2013 | Jennas, II et al. |
| 9,047,307 | B1 | 6/2015 | Ghemawat et al. |
| 9,489,434 | B1 | 11/2016 | Rath |
| 9,916,203 | B1 | 3/2018 | Pogde et al. |

(Continued)

FOREIGN PATENT DOCUMENTS

| CN | 104641365 A | 5/2015 |
| CN | 117215721 A | 12/2023 |

(Continued)

OTHER PUBLICATIONS

"About Consistency Group Snapshot Restore", Working with consistency groups, Available Online at: https://sort.veritas.com/public/documents/HSO/2.0/linux/productguides/html/hfo_admin_ubuntu/ch07s10.htm, 2 pages.

(Continued)

*Primary Examiner* — Tasnima Matin
(74) *Attorney, Agent, or Firm* — Kilpatrick Townsend & Stockton LLP

(57) ABSTRACT

Techniques discussed herein relate to improved data recovery techniques within cloud computing environments. The disclosed techniques utilize consistency groups that are identified for volumes corresponding to a compute instance. A plurality of resource identifiers uniquely identifying a respective cloud computing resource of the cloud computing environment can be maintained. A cloud computing instance corresponding to a resource identifier may be identified and volume metadata associated with that resource identifier is obtained. The volume metadata identifying at least one of a block volume or boot volume. A consistency group is generated for the identified volume devices for the computing instance and one or more schedules can be generated with which various snapshots of the volume devices of the group are to be subsequently generated.

20 Claims, 14 Drawing Sheets

(56) References Cited

U.S. PATENT DOCUMENTS

| | | | |
|---|---|---|---|
| 9,952,767 | B2 | 4/2018 | Zheng et al. |
| 10,459,632 | B1 | 10/2019 | Chen et al. |
| 10,664,358 | B1* | 5/2020 | Chen .................... G06F 3/0619 |
| 10,698,941 | B2* | 6/2020 | Maybee .............. G06F 12/0897 |
| 10,756,888 | B2 | 8/2020 | Han |
| 10,922,132 | B1 | 2/2021 | Shiramshetti et al. |
| 11,086,545 | B1 | 8/2021 | Dayal et al. |
| 11,151,092 | B2 | 10/2021 | Chmiel et al. |
| 11,372,725 | B2 | 6/2022 | Bajaj |
| 11,575,727 | B1 | 2/2023 | Woodruff et al. |
| 12,001,404 | B2 | 6/2024 | Kashi Visvanathan et al. |
| 2006/0271598 | A1 | 11/2006 | Wong et al. |
| 2008/0109496 | A1 | 5/2008 | Holenstein et al. |
| 2008/0168218 | A1* | 7/2008 | Arakawa ............. G06F 11/1471 711/112 |
| 2009/0307277 | A1 | 12/2009 | Grubov et al. |
| 2011/0213765 | A1* | 9/2011 | Cui ....................... G06F 16/951 707/711 |
| 2012/0131595 | A1 | 5/2012 | Kim et al. |
| 2012/0317079 | A1 | 12/2012 | Shoens et al. |
| 2013/0339407 | A1* | 12/2013 | Sharpe .................. G06F 16/137 707/827 |
| 2014/0052692 | A1 | 2/2014 | Zhang et al. |
| 2015/0066857 | A1 | 3/2015 | Dayal et al. |
| 2015/0074536 | A1 | 3/2015 | Varadharajan et al. |
| 2016/0188380 | A1 | 6/2016 | Eastep et al. |
| 2018/0101311 | A1 | 4/2018 | Koszewnik |
| 2020/0210223 | A1 | 7/2020 | Saka et al. |
| 2020/0250684 | A1 | 8/2020 | Puehse et al. |
| 2020/0333970 | A1* | 10/2020 | Mukku ............... G06F 12/0253 |
| 2020/0334111 | A1 | 10/2020 | Potnis et al. |
| 2020/0409974 | A1 | 12/2020 | Ayzenberg et al. |
| 2021/0226861 | A1* | 7/2021 | Barsalou .............. G06F 9/5061 |
| 2021/0390078 | A1 | 12/2021 | Aahlad et al. |
| 2022/0060323 | A1 | 2/2022 | Payne et al. |
| 2022/0147490 | A1 | 5/2022 | Shivani et al. |
| 2022/0188267 | A1 | 6/2022 | Patil et al. |
| 2022/0198322 | A1* | 6/2022 | Kuperman ............. G06N 20/00 |
| 2023/0385153 | A1 | 11/2023 | George et al. |
| 2024/0028466 | A1 | 1/2024 | Duggal et al. |

FOREIGN PATENT DOCUMENTS

| | | |
|---|---|---|
| JP | 2017531256 A | 10/2017 |
| WO | 2015110171 A1 | 7/2015 |

OTHER PUBLICATIONS

"About HyperScale Consistency Groups", Working with consistency groups, Available Online at: https://sort.veritas.com/public/documents/HSO/2.0/linux/productguides/html/hfo_admin_ubuntu/ch07s02.htm, 1 page.

"Amazon EFS Replication", Amazon Elastic File System, Available Online at: https://docs.aws.amazon.com/efs/latest/ug/efs-replication.html, Oct. 3, 2022, 18 pages.

"Announcing Amazon Elastic File System Replication", Available Online at: https://aws.amazon.com/about-aws/whats-new/2022/01/amazon-elastic-file-system-replication/, Jan. 25, 2022, 3 pages.

"AWS KMS Concepts", AWS Key Management Service, Available Online at: https://docs.aws.amazon.com/kms/latest/developerguide/concepts.html, Oct. 3, 2022, 36 pages.

"Caringo Swarm Hybrid Cloud for Azure", Caringo Swarm, Available Online at: https://azure.github.io/Storage/docs/storage-partners/partners/MultiProtocol/Caringo-Azure.pdf, 2017, 1 page.

"Caringo's Swarm Hybrid Cloud Object Storage Platform Now Integrated with Reach Engine by Levels Beyond and Microsoft Azure", Available Online at: https://www.broadcastbeat.com/caringos-swarm-hybrid-cloud-object-storage-platform-now-integrated-with-reach-engine-by-levels-beyond-and-microsoft-azure/, Oct. 3, 2022, 5 pages.

"Create Amazon EBS Snapshots", Available Online at: https://docs.aws.amazon.com/AWSEC2/latest/UserGuide/ebs-creating-snapshot.html, 2022, 4 pages.

"Create Consistency Groups", Available Online at: https://library.netapp.com/ecmdocs/ECMP12404965/html/GUID-AA34DCF7-6827-4ACC-AA5E-63B1FEA8EFCE.html, Jan. 2016, 2 pages.

"How AWS DataSync Works", AWS DataSync, Available Online at: https://docs.aws.amazon.com/datasync/latest/userguide/how-datasync-works.html, Oct. 3, 2022, 5 pages.

"How File Replicator Works", Veritas, Accessed from Internet on Oct. 3, 2022, 1 page.

"Replication for File System Agents", Available Online at: https://documentation.commvault.com/v11/essential/129963_replication_for_file_system_agents.html, Dec. 7, 2021, 2 pages.

"Snapshot Schedules and Snapshot Consistency Groups", Available Online at: https://thinksystem.lenovofiles.com/storage/help/index.jsp?topic=%2Fthinksystem_system_manager_11.50.1%2F34EADF0C-B783-4FED-B187-28B016EE22B6_.html, 2 pages.

"Snapshotting a Consistency Group", Available Online at: https://www.ibm.com/docs/en/xiv-storage-system?topic=commands-snapshotting-consistency-group, Jun. 12, 2022, 5 pages.

"The Definitive Guide to Rubrik Cloud Data Management", Available Online at: https://www.rubrik.com/content/dam/rubrik/en/resources/white-paper/Definitive-guide-rubrik-cloud-data-management.pdf, Jun. 8, 2021, 41 pages.

"What is AWS DataSync?", Available Online at: https://docs.aws.amazon.com/datasync/latest/userguide/what-is-datasync.html, Oct. 3, 2022, 3 pages.

Mashtizadeh et al., "Replication, History, and Grafting in the Ori File System", Symposium on Operating Systems Principles, Available Online at: https://www.scs.stanford.edu/~dm/home/papers/mashtizadeh:ori.pdf, Nov. 3-6, 2013, pp. 151-166.

U.S. Appl. No. 18/181,414, Non-Final Office Action mailed on Mar. 14, 2024, 78 pages.

U.S. Appl. No. 18/304,161, Notice of Allowance mailed on Mar. 19, 2024, 20 pages.

International Application No. PCT/US2023/024235, International Search Report and Written Opinion mailed on Sep. 4, 2023, 13 pages.

International Application No. PCT/US2023/024236, International Search Report and Written Opinion mailed on Sep. 6, 2023, 10 pages.

International Application No. PCT/US2023/024239, International Search Report and Written Opinion mailed on Aug. 11, 2023, 14 pages.

International Application No. PCT/US2023/024835, International Search Report and Written Opinion mailed on Aug. 8, 2023, 14 pages.

International Application No. PCT/US2023/025194, International Search Report and Written Opinion mailed on Aug. 18, 2023, 13 pages.

U.S. Appl. No. 18/332,462, Non-Final Office Action, Mailed On Apr. 25, 2024, 18 pages.

U.S. Appl. No. 18/326,447, Non-Final Office Action, Mailed On Jun. 12, 2024, 8 pages.

U.S. Appl. No. 18/181,414, "Notice of Allowance", mailed Sep. 30, 2024, 12 pages.

Khurana et al., "Efficient Snapshot Retrieval Over Historical Graph Data", Institute of Electrical and Electronics Engineers, 2012, pp. 997-1008.

U.S. Appl. No. 18/169,121, Non-Final Office Action mailed on Aug. 14, 2024, 29 pages.

U.S. Appl. No. 18/181,414, Final Office Action mailed on Aug. 12, 2024, 22 pages.

U.S. Appl. No. 18/326,447, Notice of Allowance mailed on Aug. 29, 2024, 10 pages.

U.S. Appl. No. 18/332,462, Final Office Action mailed on Jul. 25, 2024, 26 pages.

Chapman et al., Provenance and the Price of Identity, Provenance and Annotation of Data and Process, Available online at: https://www.researchgate.net/profile/Adriane-Chapman/publication/220919088_Provenance_and_the_Price_of_Identity/links/09e4150ac3676a65f5000000/Provenance-and-the-Price-of-Identity.pdf, Jun. 2008, pp. 1-14.

Mahajan et al., Effective and Efficient Compromise Recovery for Weakly Consistent Replication, Microsoft Research, Silicon Valley

(56) References Cited

OTHER PUBLICATIONS

Available online at: https://dl.acm.org/doi/pdf/10.1145/1519065.1519080?casa_token=bm_W5gUw67sAAAAA:GBn8wxxB4MV1gwmrseilCWIzHbhKLNKIYIMHQDAqZtVtETR1ZyHsk_7N6RuJ9XB1goS7NnGdQWE9dM8, Apr. 2009, pp. 131-144.
Tremel et al., Reliable, Efficient Recovery for Complex Services with Replicated Subsystems, Institute of Electrical and Electronics Engineers, Available online at: https://www.cs.cornell.edu/~weijia/papers/edward-dsn.pdf, Jun. 2020, pp. 172-183.

* cited by examiner

DATA RECOVERY TECHNIQUES USING CLOUD CONSISTENCY GROUPS

BACKGROUND

Cloud-based platforms have become increasingly common. These platforms manage large amounts of data on behalf of various users. Conventionally employed data recovery techniques include the utilization of consistency groups. Consistency groups are used to create a logical grouping of a set of volumes (e.g., volumes that must be recovered together in order to function properly). A snapshot of a consistency group snapshots all of the volumes of the consistency time within the same temporal environment (e.g., at substantially the same time). Conventionally, the user must manually define the volumes of a consistency group. There is no facility by which users of either compute instances and/or a related block volume service can automatically establish a consistent data protection scheme that spans a particular tenancy or region. Data recovery techniques also lack the ability to recover data with respect to various granularities, often requiring entire volumes to be mounted for data retrieval. Additionally, conventional platforms do not provide a way to manage the backups associated with the consistency group to dispose of stale data. The disclosed techniques address these deficiencies, individually, and collectively.

BRIEF SUMMARY

Techniques are provided (e.g., a method, a system, and/or non-transitory computer-readable medium storing code or instructions executable by one or more processors) for managing backups within cloud-computing environments using consistency groups. Various embodiments are described herein, including methods, systems, non-transitory computer-readable media storing programs, code, or instructions executable by one or more processors, and the like.

One embodiment is directed to a method. The method may comprise maintaining, by a computing device, a plurality of resource identifiers, a resource identifier of the plurality of resource identifiers uniquely identifying a cloud computing resource of the cloud computing environment. The method may comprise identifying, by the computing device, a cloud computing instance corresponding to a resource identifier of the plurality of resource identifiers. The method may comprise obtaining, by the computing device, volume metadata associated with the resource identifier. In some embodiments, the volume metadata identifies a group of volume devices comprising one or more volume devices. The group of volume devices may comprise at least one of: a block volume device or a boot volume device. The method may include generating, by a computing device, a consistency group based at least in part on the group of volume devices identified for the cloud computing instance. The method may comprise generating, by the computing device, one or more schedules with which one or more snapshots of the group of volume devices are to be subsequently generated.

In some embodiments, generating the one or more schedules causes a second computing device to generate at least one snapshot of the group of volume devices based at least in part on at least one schedule of the one or more schedules.

In some embodiments, the method further comprises indexing (e.g., by the computing device) the at least one snapshot of the group of volume devices based at least in part on executing an offline process, and generating (e.g., by the computing device), index metadata corresponding to the group of volume devices based at least in part on the indexing. In some embodiments, the index metadata comprises at least one of: a file name, a full directory path corresponding to a file, a-time information, m-time information, c-time information, or a file size corresponding to a file stored on at least one of the group of volume devices. A-time information includes a value that indicates a time at which file was accessed (e.g., by a user or computing component). M-time information refers to a to a value indicating a time at which the contents of the file were changed. C-time information refers to a value indicating a time at which attributes of the file change such as ownership or permission data. The computing device may associate the index metadata with the group of volume devices.

In some embodiments, indexing the at least one snapshot is performed by a computing agent installed within a tenancy of the cloud computing environment. In some embodiments, indexing the at least one snapshot further includes mounting the at least one snapshot within a preconfigured computing instance; and scanning the file system of the at least one snapshot mounted within the preconfigured compute instance. The file metadata may be generated based at least in part on the scanning.

In some embodiments, generating the index metadata further comprises generating an index mapping for each volume device of the group of volume devices. In some embodiments, the index mapping maintains corresponding relationships between shards, block volumes, file system volumes, and files within a respective volume device of the group of volume devices. The index mapping may be associated with at least one of the respective volume devices and/or the consistency group identifier.

In some embodiments, the method may comprise providing a user interface presenting the index metadata. The user interface may present a plurality of options corresponding to differing snapshot recovery scopes. The user input, corresponding to a request to recover specific data from a specific snapshot, may be received via the user interface. The specific data may be associated with a specific data scope of the differing snapshot recovery scopes. In some embodiments, the differing snapshot recovery scopes comprise at least two of: a file-level recovery scope, a shard-level recovery scope, a block-level recovery scope, or an instance-level recovery scope.

Another embodiment is directed to a computing service of a cloud computing environment, the computing service comprising one or more processors and one or more non-transitory computer-readable instructions that, when executed by the one or more processors, cause the cloud-computing system to perform one or more of the disclosed methods. The computing service can be executed by any suitable number of computing devices and/or virtual machines.

Yet another embodiment is directed to a non-transitory computer-readable medium storing computer-executable instructions that, when executed by one or more processors of a computing service, cause the computing service to perform one or more of disclosed methods. The computing service can be executed by any suitable number of computing devices and/or virtual machines.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which.

DETAILED DESCRIPTION

Figure 1:
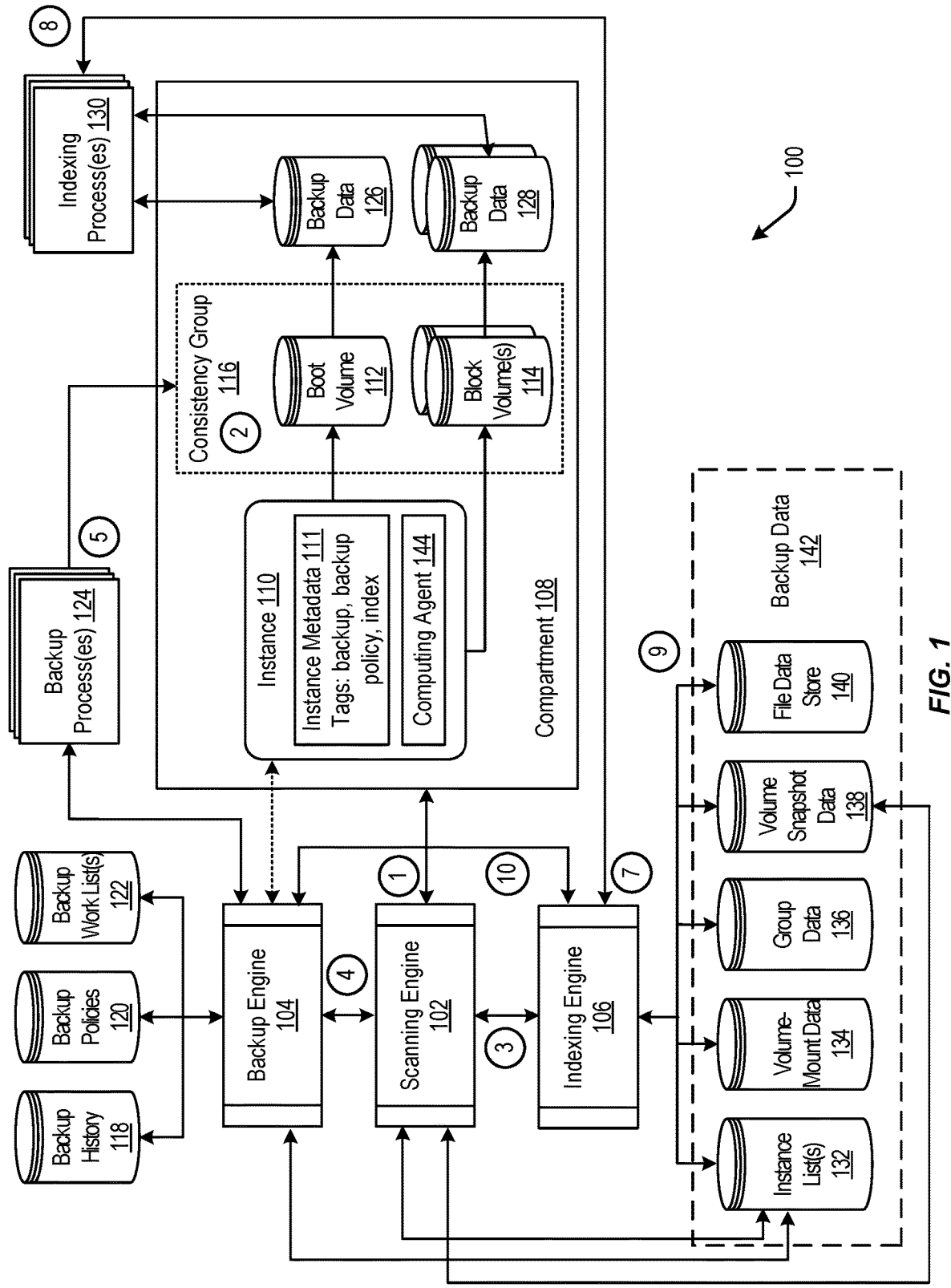
FIG. 1 illustrates an example cloud-computing environment that includes any suitable number of computing components and depicts a method for managing backups within cloud-computing environments using consistency groups, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for managing backups within cloud-computing environments using consistency groups. As used herein, a "consistency group" is a logical grouping of block and/or boot volumes or other suitable resources of a cloud-computing environment. Conventional approaches to generating consistency groups are largely a time-consuming process in which a user must explicitly specify the resources (e.g., volumes) to be grouped. Currently, there is no facility by which a cloud user of either compute instances and/or related block and/or boot volume services can automatically establish a consistent data protection scheme that spans a particular tenancy or region. Additionally, current approaches do not provide a mechanism with which to manage the backups associated with the consistency group with respect to disposing of stale data. The term "backups" is intended to refer to both backups and/or snapshots. A backup is a flexible copy of a resource (e.g., one or more files, a volume, one or more volumes of an instance, etc.). A snapshot generally refers to a point-in-time copy of a resource. Snapshots generally maintain metadata that identify a state of the resource at a certain point in time, preserving a virtual picture of the resource's file system and settings, while a backup generally performs a full copy of the resource's data.

The disclosed techniques include inventorying all the compute instances in a particular tenancy. In some embodiments, resource identifiers may be obtained (e.g., from a cloud service configured to manage resource identifiers for various resources of the cloud computing environment operated by a cloud provider). A "resource identifier" refers to an identifier by which a given resource (e.g., boot volume, block volume, service, instance, etc.) can be uniquely identified from other resources of the cloud computing environment). Oracle Cloud Identifiers (OCIDs) which are used within the Oracle Cloud Infrastructure (OCI) are an example of such identifiers and are used herein in various examples. It should be understood that any reference to OCIDs may be similarly applied to other resource identifiers.

In some embodiments, a service or application (also referred to herein as a "backup service") executing at a computing device of the cloud computing environment may be configured to obtain a subset (or all) OCIDs of the cloud computing environment. Any suitable number of compute instances (e.g., a virtual machine instance) may be identified using these OCIDs. By way of example, each OCID may be associated with a corresponding device type or other metadata that identifies the OCID as identifying a compute instance. The backup service may utilize the OCIDs of the compute instances to identify associated boot and/or block volumes for each compute instance. As used herein, a "block volume" refers to a detachable block storage device that allows a storage capacity of a compute instance (also referred to as a "virtual machine instance") to be dynamically expanded. A "boot volume" refers to a detachable boot volume device that contains an image used to boot a compute instance.

Once identified, the boot and block volumes for an instance may be automatically associated with a consistency group identifier generated by the backup service to identify the specific consistency group. The backup service can manage snapshot generation for the consistency groups according to a modifiable schedule. The schedule may initially be user defined or system defined.

In some embodiments, the snapshot(s) may be provided to another computing component (e.g., an indexing engine) that is configured to execute an indexing process in order to index the boot and/or block volumes of the snapshot. "Indexing," as used herein, refers to a process for examining various files, folders, directories, etc. of a snapshot and generating/cataloging metadata (also referred to as "index metadata") which comprises a file name, a full directory path corresponding to the file, a-time information, m-time information, c-time information, file size, and the like, or any suitable combination of the above. The indexing process may be performed offline and may include mounting at least one snapshot within a preconfigured computing instance, scanning the file system of the mounted snapshot, and generating and storing the index metadata corresponding to the snapshot.

As part of generating the index metadata for a given volume, a mapping between shards, Logical Unit Number (LUN) blocks (also referred to as "block volumes"), file system volumes, and files within the volume may be created. A LUN block refers to a volume that has a LUN assignment (e.g., a virtual address with which data may be sent or read from the corresponding block volume). The mapping may be stored within the associated volume and/or as being associated with the consistency group identifier. The generated mapping can enable a user to later recover data at a variety of different granularities (e.g., block-level, file level, shard level, etc.) without requiring the entire corresponding volume to be remounted.

The indexing process can include executing a deduplication process on the snapshots to remove duplicate data, causing the total memory space generally requested to store the snapshot to be reduced. The lifecycle of the obtained snapshots can be managed to migrate older snapshots from block volume storage to cold storage after some time. In some embodiments, the indexing process and mapping generation may be performed with a computing agent (an "agent," for brevity) installed within the user's tenancy so that the corresponding operations can be performed and stored in the user's enclave or other private storage, enabling the customer to maintain data privacy of the files in their instances.

The techniques discussed herein provide improved storage techniques that increase the likelihood that the user's data will be protected/backed up, while reducing and/or eliminating the need for human interaction. The techniques enable a protection scheme to be implemented for compute instances and/or related block and/or boot volumes across a particular tenancy or region. Using the disclosed techniques, enables data retrieval for a variety of granularities that were previously unavailable. The disclosed techniques provide for storage improvements through disposing, or otherwise relocating, stale snapshots and/or index metadata associated with compute instances and/or associated boot and/or block volumes, enabling the backup service to remain within a memory budget (e.g., a predefined cache/storage memory size).

Moving on to FIG. 1, in which an example cloud-computing environment 100 that includes any suitable number of computing components is illustrated and a method for managing backups within cloud-computing environments using consistency groups is depicted, in accordance with at least one embodiment. Cloud-computing environment 100 may include various components associated with a backup application and/or backup service (not depicted). By way of example, a backup service may include a scanning engine 102, a backup policy engine 104, and an indexing engine 106. The functionality of these engines can be distributed as described, or the described functionality may be combined or different distributed across any suitable number of computing components. Thus, the specific architecture described in FIG. 1 is merely illustrative, and not intended to limit the scope of this disclosure.

In some embodiments, a compute instance (e.g., instance 110, a virtual machine instance) may be provisioned with cloud computing infrastructure components and boot volume 112 and block volume(s) 114 may be deployed or otherwise installed at the instance 110 within compartment 108 (e.g., a user's cloud computing tenancy or other suitable compartment). A user may tag, or otherwise associate, the instance 110 with one or more tags (e.g., labels, identifiers, etc.) that indicate aspects of backing up the instance 108. By way of example, the one or more tags can include any suitable combination of the following: a backup tag indicating whether backup is desired for the instance 110, one or more backup policy tags indicating one or more backup policies (e.g., daily backups, hourly backups, monthly backups, yearly backups, etc.) to be employed when backing up instance 110, a file index tag indicating whether indexing is desired for the instance 108, and the like. These tags and/or any suitable data associated with the instance may be referred to as "instance metadata." Initially, a consistency group may not exist for the volumes associated with instance 110 (e.g., the boot volume 112 and block volume(s) 114).

At any suitable time (e.g., according to a predefined frequency and/or schedule), the scanning engine 102 may be configured to scan any suitable tenancies and/or compartments (e.g., compartment 108) for compute instances (e.g., instance 110, an example of a virtual machine instance associated with boot volume 112 and one or more block volumes (e.g., block volume(s) 114). This may include searching identifiers (e.g., OCIDs) corresponding to various resources associated with the compartment 108 for ones that are identified as corresponding to a compute instance. As described above, the compute instances (e.g., instance 110) may be associated with one or more tags (e.g., backup labels and/or identifiers that indicate that backup of the compute instance is desired, a backup policy (e.g., indicating a schedule or other frequency with which one or more backups of the instance 110 are to be generated), a file index (e.g., file index metadata associated with the file system utilized by the boot volume 112 and/or block volume(s) 114). The scanning engine 102 may be configured to scan the various compartments (e.g., compartment 108) associated with a user according to a predetermined frequency or schedule (e.g., every 30 minutes, every hour, every day, etc.). The frequency and/or schedule may be modifiable by a user via any suitable user interface and/or configuration file (not shown).

In some embodiments, the scanning engine 102 may be configured to identify whether a consistency group exists for the volumes (e.g., boot volume 112 and block volume(s) 114) associated with a given instance (e.g., instance 108). In some embodiments, the scanning engine 102 may maintain consistency group data including consistency group metadata corresponding with respective known consistency groups. In other embodiments, the scanning engine 102 may obtain consistency group data from a separate service (not depicted) or storage location (not depicted) that is configured to maintain and/or store such data. By comparing any suitable combination of the identifiers (e.g., OCIDs) associated with the instance 108, boot volume 112, and/or block volume(s) 114 to the identifiers (e.g., OCIDs) of the instances and volumes (e.g., boot and/or block) of the consistency group metadata corresponding to each known consistency group, the scanning engine 102 may determine whether a consistency group already exists for the volumes identified as being associated with instance 108. If a consistency group identifier and/or consistency group metadata already exists that matches the volumes (e.g., boot volume 112 and block volume(s) 114) associated with the instance (e.g., instance 108), the scanning engine 102 may cease further processing. If, however, a consistency group identifier/metadata does not exist for those volumes associated with that instance, the scanning engine 102 may be configured to generate a consistency group (e.g., consistency group 116) for those volumes and execute instructions that cause the consistency group identifier and corresponding volume and instance identifiers (OCIDs), collectively referred to as "consistency group metadata" to be added to the consistency group data.

In situations when the scanning engine 102 generates consistency group 116 and corresponding consistency group data, it may determine from instance metadata 111 (including tags and any suitable data associated with the instance (e.g., instance 108)) that backup and/or file indexing is desired. If backup is desired, the scanning engine 102 may be configured to provide the consistency group data and the instance metadata 111 associated with the instance (e.g., instance 108) to backup engine 104. Instance metadata 111 may be retrieved from storage of the instance and/or from a service or storage (not depicted) configured to manage such data. In some embodiments, the scanning engine 102 may add instance metadata 111 to the consistency group data before sending.

Backup engine 104 may be configured to store backup history 118, backup policies 120, and backup work list(s) 122 in any suitable data store(s) configured to store such information (not depicted). A backup policy may specify any suitable information related to a policy with which subsequent backups (e.g., snapshots) are to be generated for various volume(s) (e.g., the volume(s) of a consistency group such as consistency group 116). As an example, a backup policy may specify data such as: an identifier associated with the backup policy, a frequency or schedule by which snapshots are to be generated for volumes of a consistency group subject to the backup policy, expiration and/or eviction policies associated with stored snapshots associated with the consistency group subject to the backup policy, or any suitable aspect by which backups and/or snapshots of one or more volumes (e.g., one or more volumes associated with a consistency group) subject to the given backup policy are to be managed.

Backup engine 104 may be configured to generate and store one or more backup work lists(s) 122 indicating particular backup tasks to be performed. In some embodiments, the backup work list(s) may indicate particular instances and/or volumes and/or or any suitable information relating to the backup to be performed. By way of example, the backup engine 104 may generate backup work list(s) 122 (also referred to as "backup work list data") that indicate one or more volumes (e.g., boot volume 112, block volume(s) 114) associated with a compute instance (e.g., instance 108) and/or an identifier for consistency group 116, one or more time(s) corresponding to the next snapshot(s) to be taken of the volume(s), an indication as to whether the snapshot(s) of the volume(s) are to be indexed (e.g., as indicated via the instance metadata provided by the scanning engine 104), or the like. It should be appreciated that the data corresponding to backup history 118, backup policies 120, and/or backup work list(s) 122 may be combined in any suitable manner and stored by the backup engine 104 for subsequent use.

In some embodiments, backup engine 104 may retrieve backup work list(s) 122 to identify subsequent backups and/or snapshots to be performed. The backup engine 104 may retrieve a subset of backup work list(s) 122 according to a predetermined frequency or schedule and/or events and/or the backup engine 104 may, at any suitable time, configure events and/or alarms to be triggered according to the tasks associated with the backup work list(s) 122. By way of example, the backup engine 104 may configure an alarm or other event to be triggered (e.g., a call back event) that causes the backup engine 104 to initiate a backup of the identified volume(s). As another example, the backup engine 104 may periodically scan the previously-stored backup work list(s) to identify times by which the next backup is to be performed. By comparing a current time to the times by which the next backup is to be performed, the backup engine 104 can identify whether to initiate a backup of any given volume. In some embodiments, the backup work list(s) 122 can include a single list of all backup tasks or multiple lists (e.g., multiple lists, each corresponding to a given volume or consistency group of one or more volumes such as consistency group 116). In some embodiments, the time corresponding to the next scheduled backup may correspond to all volumes associated with the consistency group (e.g., boot volume 112 and block volume(s) 114, in the ongoing example).

The backup engine 104 may be configured to time stamp the backup work list(s) 122 and/or configure corresponding events/alarms based at least in part on the instance metadata 111. By way of example, a tag (e.g., a label or identifier) indicating a daily backup is desired for the volumes corresponding to instance 110 (e.g., the volumes of consistency group 116) may cause the backup engine 104 to time stamp a corresponding work list or configure an event or alarm for that work list in a manner than causes the backup engine 104 to initiate a daily backup and/or snapshot of the volumes/consistency group (e.g., a backup that occurs every 24 hours). The exact time of the time associated with each backup may be assigned according to predefined rules (e.g., according to a daily backup policy of backup policies 120). Similar operations corresponding to weekly, monthly, yearly, a user defined periodicity, and the like may be executed to cause backups and/or snapshots to be generated for one or more volumes (e.g., volumes of a consistency group) according to a respective backup policy of backup policies 120.

In some embodiments, the backup engine 104 may initiate any suitable number of backup process(es) 124 that may individually be responsible for executing operations for performing one or more backup tasks. By way of example, backup engine 104 can identify from backup work list(s) 122 that a snapshot of each volume of consistency group 116 is to be performed. In response to this identification, the backup engine 104 may initiate one or more backup process (es) 124 to execute operations for generating a snapshot of boot volume 112 and block volume(s) 114 (e.g., any volume corresponding to a work list and/or consistency group corresponding to a work list). As a non-limiting example, the backup engine 104 may initiate a single backup process to generate backup data 126 (e.g., a snapshot of boot volume 112) and backup data 128 (e.g., snapshots corresponding to block volume(s) 114). Backup data 126 and/or backup data 128 may be stored at the instance 110 and/or any suitable combination of backup data 126 and/or backup data 128 may be stored at a different storage location (e.g.,).

In some embodiments, the backup process(es) 124 and/or the backup engine 104 may be configured to store an entry related to the backup(s) performed and the backup data generated for that backup. As a non-limiting example, the backup engine 104 may identify that backup process(es) 124 have concluded and caused generation of backup data 126 and backup data 128. The backup engine 104 may store one or more entries in backup history 118 indicating a time at which backup data 126 and backup data 128 were generated. Any suitable information related to the backup data 126 and backup data 128, such as corresponding storage locations, applied backup policies that caused generation of said data, an instance identifier corresponding to an instance associated with the backups (e.g., instance 110), a consistency group identifier (e.g., an identifier corresponding to consistency group 116), or the like may be maintained in the entry.

The backup engine 104 may identify (e.g., from instance metadata 111) any suitable information (e.g., a tag, label, or identifier) indicating that the backups generated for volumes associated with the instance are to be indexed. If indexing is desired, as determined from this information, the scanning engine 102 may invoke the functionality of indexing engine 106 at any suitable time.

Indexing engine 106 may be configured to initiate any suitable number of processes (e.g., indexing process(es) 130 to index/catalog any suitable number of backups and/or snapshots. By way of example, indexing engine 106 can initiate an indexing process for each of backup data 126 and backup data 128 or an indexing process that will perform indexing for both backup data 126 and backup data 128. Indexing backup data may include mounting the backup data 126 to a predefined virtual machine instance (not depicted) and scanning the backup data to generate index metadata (an example of which is described in further detail with respect to FIG. 2). Index metadata may include indexing information for a variety of granularities such as identifying data corresponding to files, file system blocks, volume blocks (also referred to herein as a "LUN" block), and shards.

At any suitable time, scanning engine 102, backup engine 104, and/or indexing engine 106 may store any suitable portion of backup data 142. Backup data 142 may include any suitable combination of data associated with the instance (e.g., instance metadata 111, in instance list(s) 132), consistency group (e.g., in group data 126), volume mount information (e.g., in volume-mount data 134), volume information corresponding to volumes created during the indexing process (e.g., in volume snapshot data 138), files indexed from the created volumes (e.g., in file data store 140), or any suitable index metadata (e.g., index metadata 200) which may indicate a mapping between files, file system blocks, volume blocks, and shards.

A method is disclosed for managing backups within cloud-computing environments using consistency groups is depicted. The method may be performed by the components of FIG. 1 (e.g., scanning engine 102, backup engine 104, indexer 106, etc.) as part of a backup service (not depicted). The order of operations depicted in FIG. 1 is intended to be illustrative and is not intended to limit the scope of this disclosure. In some embodiments, more or fewer operations may be performed. The operations of the method depicted in FIG. 1 may be performed in other orders than the one provided in FIG. 1.

At step 1, the scanning engine 102 may identify all instances (e.g., instance 110, as depicted) within a compartment (e.g., compartment 108, an example of a tenancy of a cloud computing environment). In some embodiments, the scanning engine 102 may retrieve resource identifiers associated with the compartment 108 from a service and/or data store (e.g., not depicted) configured to manage such information. Each resource identifier may be associated with a resource type (e.g., indicating the resource is an instance, a volume, a service, etc.) and an identifier (e.g., OCID) that uniquely identifies the resource. In some embodiments, resource identifiers corresponding to instances may be associated with resource identifiers associated with volumes attached to the instance (e.g., boot volume 112 and block volume(s) 114). The scanning engine 102 may identify which resource identifiers have resource type values that correspond to an instance and which resource identifier(s) correspond to volumes that are attached to those instances. The resource identifiers corresponding to the identified instance(s) and attached volumes may be stored in instance list(s) 132. In some embodiments, instance list(s) 132 may store previously identified instance identifiers (e.g., all instances, each instance identified within a compartment, etc.) and the corresponding identifiers associated with the volumes attached to that instance. Instance metadata 111 may be retrieved from instance 110 (or a corresponding service or storage location, not depicted, that is configured to maintain the metadata associated with instances) as being associated with a corresponding identifier associated with instance 110. In some embodiments, instance list(s) 132 may already include instance metadata 111 and thus, instance metadata 111 may be retrieved from instance list based on the identifier associated with instance 110. Instance metadata 111 can include any suitable combination of a resource identifier for the instance (e.g., an OCID for instance 110), one or more resource identifiers for the attached volumes (e.g., OCIDs for boot volume 112 and block volume(s) 114), and any suitable number of tags (e.g., labels, identifiers, indicators, etc.) that indicate whether a backup of the instance is desired, one or more backup policies to be utilized, and/or whether indexing of the backups is desired.

The scanning engine 102 may identify whether backups (e.g., snapshots) of the volumes of the instance 110 are desired. In some embodiments, the scanning engine 102 may identify that backups are desired for the volumes of instance 110 based at least in part on identifying that a tag (e.g., a label or identifier) associated with the instance 110 (e.g., a tag of instance metadata 111) indicates that backups are desired is associated with the instance 110. In some embodiments, one or more tags indicating one or more backup policies to be utilized (e.g., a daily backup, a weekly backup, a monthly backup, etc.) may be used as an indication that backups are desired for the volumes of the instance, while in other embodiments a separate tag may be utilized to indicate more generally that backups are desired. If the scanning engine determines backup are not desired, processing may cease.

At step 2, if the scanning engine 102 determines that backups are desired for the index, the scanning engine 102 may determine whether a consistency group already exists for the instance 110. By way of example, the scanning engine 102 may identify from group data 136 whether a consistency group identifier is associated with the instance 110 and/or whether a consistency group identifier is associated with volumes attached to the instance 110 (e.g., the boot volume 112 and block volume(s) 114 as identified from instance list(s) 132). In some embodiments, the scanning engine 102 may request volume mount information for the instance from computing agent 144 (e.g., a computing agent that is installed within the portion of the instance 110 that is running the operating system). The computing agent 144 may be configured to provide relative mounts of the volumes attached to instance 110 (e.g., boot volume 112 and block volume(s) 114), this mount data may be returned to the scanning engine 102 and stored in volume-mount data 134. The scanning engine 102 may identify whether the volumes identified by the computing agent 144 match any set of volumes associated with the instance 110 by comparing such data to the group data 136. If no match is found for the instance 110 and/or the set of boot volume 112 and block volume(s) 114, a consistency group may be generated by the scanning engine 102. This can include generating a unique identifier (e.g., a new OCID, a consistency group identifier, etc.) and a mapping that maps the consistency group identifier for the consistency group 116 to the identifier corresponding to instance 110 and/or the associated volume identifiers (e.g., OCIDs) corresponding to boot volume 112 and block volume(s) 114. These identifiers and consistency group mapping can be stored by the scanning engine 102 as part of group data 136. Alternatively, as depicted at step 3, the scanning engine 102 can pass such data to the indexing engine 106, which in turn can store the data as part of group data 136.

At step 4, the scanning engine 102 may pass any suitable combination of the consistency group data corresponding to consistency group 116 and the instance metadata 111 corresponding to instance 110 to backup engine 104. In some embodiments, requesting the volume-mount data from the computing agent 144 can be alternatively performed by the backup engine 104 at any suitable time. Thus, either or both the scanning engine 102 and/or the backup engine 104 can solicit volume-mount data from the computing agent 144. The scanning engine 102 and/or the backup engine 104 can store the returned data with volume-mount data 134 directly, or by sending such data to the indexing engine 106, which in turn may store the data in volume-mount data 134.

The backup engine 104 may identify (e.g., from instance metadata 111) that one or more backups (e.g., snapshots) are to be generated for the volumes of the consistency group 116. By way of example, the backup engine 104 may identify that the instance metadata 111 includes multiple tags that are associated with a daily, a weekly, and a monthly backup policy. The backup engine 104 may refer to preexisting rules associated with these tags which have been previously stored in backup policies 120. According to these policies, backup engine 104 may schedule corresponding backups by adding work lists to backup work list(s) 122). In some embodiments, a work list includes work information for generating backups (e.g., full backups, snapshots, etc.) for a single volume or multiple volumes (e.g., all of the volumes of a consistency group such as consistency group 116). The backup engine 104 may time stamp or otherwise schedule (e.g., by event, trigger, etc. as described above) the work associated with a work list in accordance with the corresponding backup policy. For example, if instance 110 is associated with tags indicating a daily, a weekly, and a monthly backup is desired, backup engine 104 may store a first set of work lists corresponding to a daily snapshot of the volumes of consistency group 116, a second set of work lists corresponding to a weekly snapshot of the volumes of consistency group 116, and a third set of work lists corresponding to a monthly snapshot of the volumes of consistency group 116. In some embodiments, the backup engine 104 may schedule a worklist corresponding to the next backup to be performed for a consistency group (e.g., a worklist for the next daily snapshot, another for the next weekly snapshot, another for the next monthly snapshot, etc.). Scheduling a subsequent backup for the corresponding backup policy could be performed when the next backup has been completed. In other embodiments, the backup engine 104 may schedule any suitable number of worklists for the consistency group according to predefined rules and/or for a subsequent predetermined period of time (e.g., for the next six months).

At step 5, the backup engine 104 may identify one or more backups to be generated based at least in part on referring to the backup work list(s) 122 and may spawn/initiate one or more backup processes (e.g., backup process(es) 124) to perform said backups (e.g., full backups, snapshots, etc.). In some embodiments, the backup work list(s) 122 may be associated with alarms/events configured by the backup engine 104 which will trigger the backup engine 104 to initiate the backup process corresponding to the work list. For each backup to be performed, the backup engine 104 may initiate (e.g., spawn) a backup process of backup process(es) 124. Each of backup process(es) 124 may be instructed/configured to perform operations for generating a backup (e.g., a snapshot) of one or more volume(s) of the consistency group 116.

At step 6, the one of the backup process(es) 124 may generate a backup data 126 (e.g., a snapshot of boot volume 112) while the same or a different backup process may be configured to generate some portion of backup data 128 (e.g., one or more snapshots corresponding to block volume(s) 114). An identifier (e.g., an OCID) for a snapshot of the consistency group 116 (also referred to as a "consistency group backup identifier") may be associated with the volume snapshot data (e.g., the combined data of backup data 126 and backup data 128) corresponding to the volumes of the consistency group. The consistency group backup identifier associated with the backup and the volume snapshot data including the backup data 126 and backup data 128 (or the location of the volume snapshot data in memory) may be sent to backup engine 104, which in turn may store the consistency group backup identifier and volume snapshot data in volume snapshot data 128, directly, or by sending the consistency group backup identifier and volume snapshot data (or the location of the volume snapshot data in memory) to the indexing engine 106. The indexing engine 106 may be configured to store said data in volume snapshot data 138. Once backup data 126 and backup data 128 is generated, the corresponding backup processes may terminate or otherwise return to an available status. Although backup data 126 and backup data 128 are depicted as being stored within instance 110, such data may be stored in any suitable storage location that is external to the instance 110 (e.g., block storage or object storage managed by a corresponding cloud storage service).

At step 7, the backup engine 104 may determine (e.g., from the instance metadata 111) whether indexing of the backup is desired. When indexing is desired, the backup engine 104 may send the consistency group identifier and/or instance identifier for the instance 110 to the indexing engine 106 for further processing. Receipt of this data may cause the indexing engine 106 to create volumes from the volume snapshot data corresponding to the consistency group backup identifier. The consistency group backup identifier may be received form the backup engine 104 or obtained using the group data 136 (e.g., using the instance identifier as a lookup value to identify the corresponding consistency group identifier. The volume snapshot data may be identified from volume snapshot data 128 using the consistency group backup identifier to identify volume snapshot data from volume snapshot data 128. The indexing engine 106 may mount the created volumes to a predefined instance and in accordance with the volume-mount data 134 that corresponds to instance 110.

At step 8, the indexing engine 106 may initiate/spawn any suitable number of indexing process(es) 130. The indexing process(es) 130 may be configured to perform any suitable combination of mounting, indexing, and/or unmounting functions. For example, if indexing engine 106 has not mounted each of the volumes of the volume snapshot data in a predefined instance, the indexing process(es) 130 may perform operations for doing so. Each of the indexing process(es) 130 may be configured generate file index data including full paths associated with each file of the mounted volumes. The indexing process(es) 130 and/or the indexing engine 106 may be configured to generate additional data such as file system block identifiers indicating file system blocks corresponding to each file, volume block identifiers indicating volume blocks (also referred to as "LUN blocks") corresponding to each file, and shards identifiers indicating shards corresponding to each file. The indexing process(es) 130 and/or the indexing engine 106 may generate index metadata for each file of backup data 126 and backup data 128. The index metadata (an example of which is discussed in further detail with respect to FIG. 2) may maintain a mapping from each file to corresponding file system blocks, volume blocks, and shards in any suitable manner.

At step 9, the index metadata may be returned to indexing engine 106 and/or stored in file data store 140 and the mounted volumes used for indexing may be unmounted or otherwise deleted. Once indexing has concluded, any corresponding indexing process of the indexing process(es) 130 may be terminated or otherwise returned to an available status.

At step 10, the indexing engine 106 may transmit status data indicating the indexing of the backup is completion. In some embodiments, the backup engine 104 may be configured to store an entry in backup history associated with the identifier for instance 110, the consistency group identifier, the consistency group backup identifier corresponding to a particular backup (e.g., snapshot), a time stamp indicating a day and time at which the backup was concluded, the instance identifier corresponding to instance 110, a tag or policy identifier indicating a policy by which the backup was created (e.g., according to a daily backup policy), any suitable data associated with the instance 110, consistency group 116, the volume snapshot data corresponding to backup data 126 and backup data 128, or any suitable combination of the above.

In some embodiments, the backup engine 104 may periodically (e.g., according to a predefined frequency and/or schedule, by request, or at any suitable time) may scan backup history 118 to identify backups that have expired (e.g., according to expiration rules associated with the backup policy by which a given backup was generated). By way of example, backup policies 120 may include a daily backup policy that specifies that daily backups expire after a predefined time period (e.g., one week, 30 days, one year, etc.). If the time stamp corresponding to a given backup indicates a time period has elapsed since the backup was generated that breaches the predefined time period specified by a corresponding policy, the backup engine 104 may send data to the indexing engine 106 (e.g., referred to as an expiration request) to purge file entries corresponding to that backup. The expiration request may include the consistency group identifier, the instance identifier, and the consistency group backup identifier. The indexing engine 106 may delete any suitable data from the backup data 142 corresponding to the consistency group backup identifier. For example, a mapping between the consistency group identifier and the consistency group backup identifier may be deleted, the volume snapshot data corresponding to the consistency group backup identifier may be deleted from volume snapshot data 138, and any suitable index metadata corresponding to the consistency group backup identifier may be deleted from file data store 140. In some embodiments, the indexing engine 106 may return the consistency group identifier to the backup engine 104 when it has deleted the data listed above. The backup engine 104 may remove any suitable entry related to the backup from backup history 118.

It should be appreciated that deletion of any suitable data from backup data 142 may be performed with any suitable combination of the backup engine 104 and/or the indexing engine 106.

Figure 2:
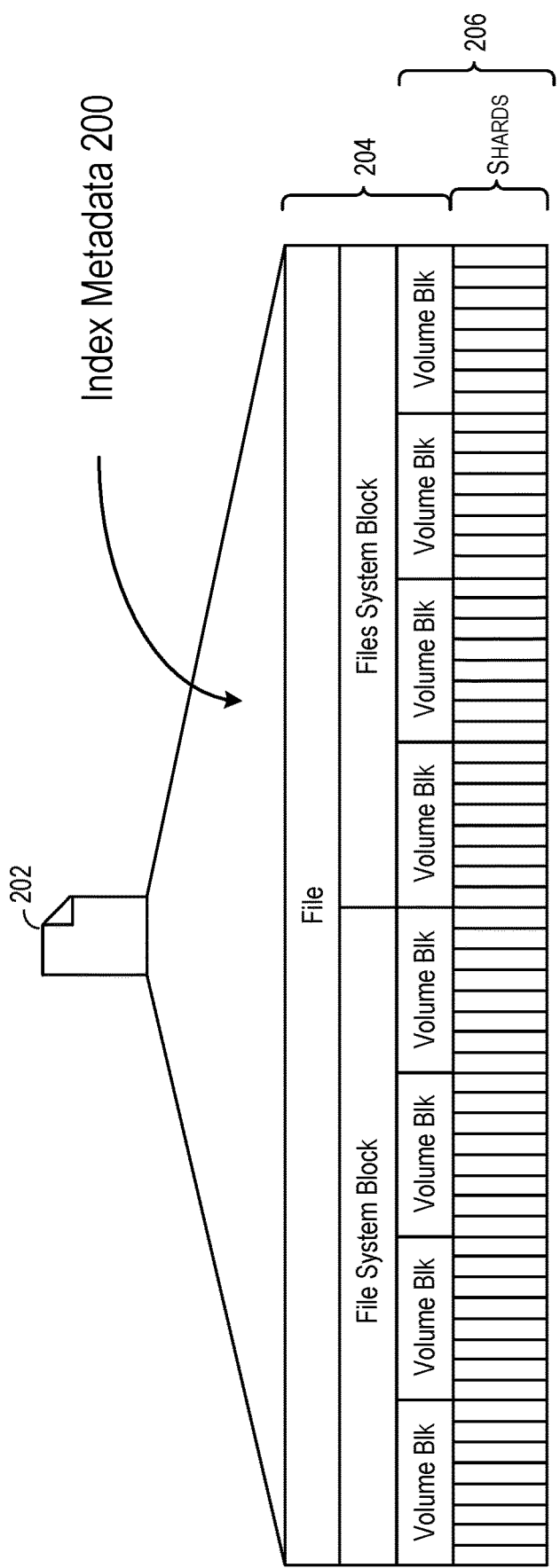
FIG. 2 illustrates an example of index metadata generated as part of the method described in FIG. 1, in accordance with at least one embodiment.

FIG. 2 illustrates an example of index metadata 200 generated as part of the method described in FIG. 1, in accordance with at least one embodiment. As described above, index metadata 200 can include a mapping between each file (e.g., file 202) of one or more volumes associated with a consistency group (e.g., the consistency group 116 of FIG. 1). In some embodiments, the file 202 may be stored in a portion of memory that spans multiple file system blocks, which span multiple volume blocks (also referred to as "LUN blocks"), which span multiple shards. The index metadata 204 may be known to an operating system executing at an instance, while index metadata 206 may be ascertained from a volume storage service (e.g., OCI block volume service). Index metadata 200 may include, for each file of the volume(s) of a consistency group: a file identifier for a file, corresponding file system block identifiers corresponding to the file, volume block identifiers corresponding to the file, and shard identifiers corresponding to the file.

Figure 3:
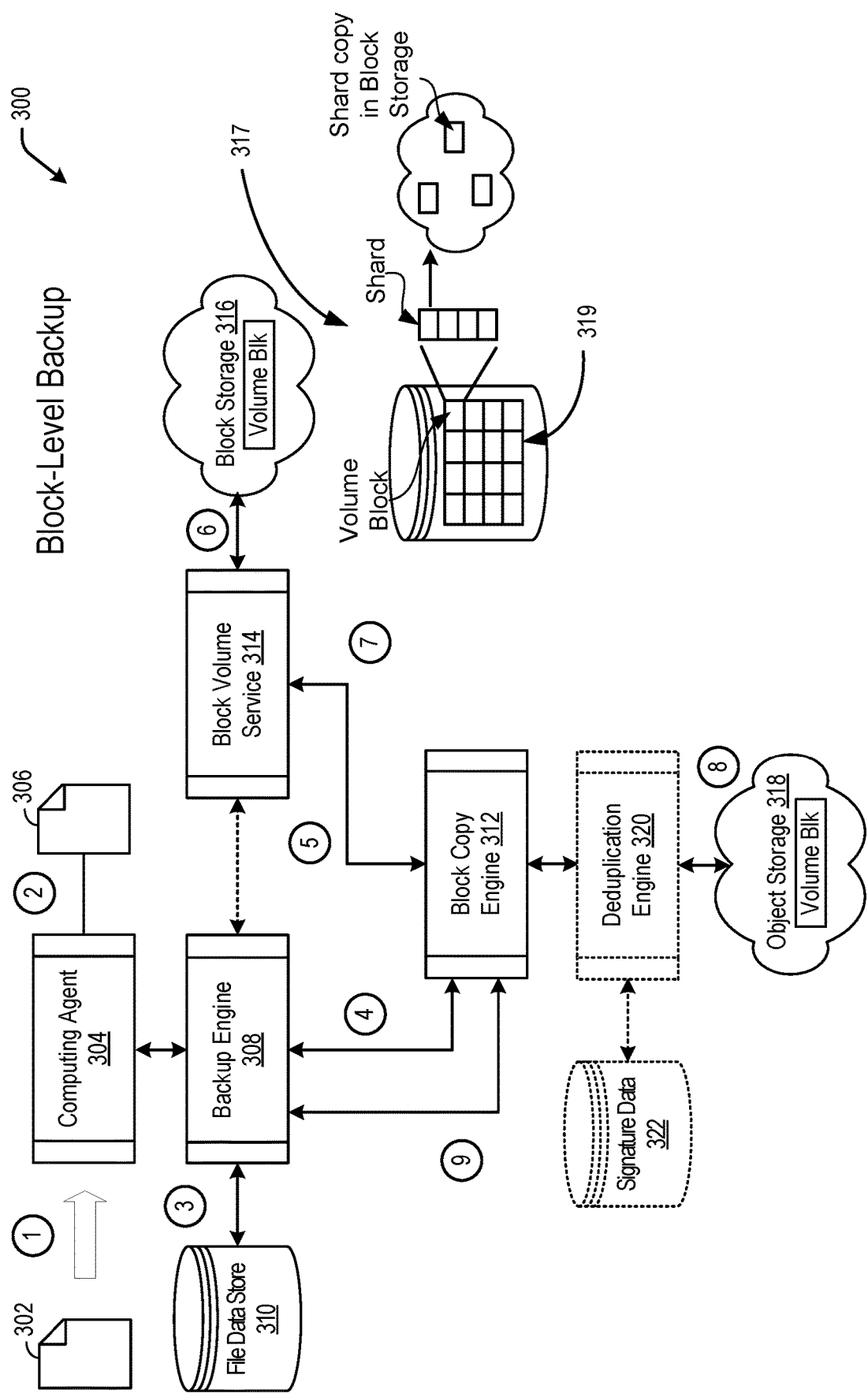
FIG. 3 illustrates a flow of an example method for executing a block-level backup, in accordance with at least one embodiment.

FIG. 3 illustrates a flow of an example method 300 for executing a block-level backup, in accordance with at least one embodiment. Index metadata 200 may be generated as part of the method 300. The operations of method 300 may be initiated by any suitable computing component such as the backup process(es) 124 of FIG. 1. As a non-limiting example, the backup process(es) 124 may scan the volumes for which the backup process(es) 124 was initiated. As a non-limiting example, one backup process may be initiated to perform a snapshot of boot volume 112 of FIG. 1, while one or more additional backup processes (one for each block volume) may be initiated for each of the block volume(s) 114 of FIG. 1. Each backup process may scan for the files stored at the corresponding volume.

At step 1, the backup process may submit the list of files (e.g., file list 302 to computing agent 304 (an example of the computing agent 144 of FIG. 1) installed at a compute instance (e.g., the instance 110 of FIG. 1).

At step 2, the computing agent 304 may request file index data 306 corresponding to index metadata 204 of FIG. 2 from the operating system executing at the given instance (e.g., instance 110). In some embodiments, the file index data 306 may include file names for each file, full or relative paths for each file, file system type, a volume identifier (e.g., an OCID corresponding to the volume), an ordered file system block list corresponding to each file, and an ordered volume block list corresponding to each file. The file index data 306 may be stored by the backup process or returned to the backup engine 308 (an example of the backup engine 104 of FIG. 1). As depicted in FIG. 3, the file index data 306 is returned to backup engine 308.

At step 3, the backup engine 308 (or in other embodiments, the corresponding backup process) may store the file index data 306 (a portion of the index metadata 200 of FIG. 2) in file data store 310 (an example of the file data store 140 of FIG. 1).

At step 4, the backup engine 308 may send a volume identifier for each volume and the corresponding volume block identifiers for each volume to a block copy engine 312. Block copy engine 312 may be a component or agent of the backup engine 308. In some embodiments, block copy engine 312 may execute within the instance (e.g., the instance 110). In some embodiments, the block copy engine 312 may be configured to interface with the block volume service 314. In some embodiments, the backup engine 308 and/or the corresponding backup process may perform the operations discussed in connection with the block copy engine 316. The block volume service 314 may be a cloud computing service configured to manage block storage (e.g., block storage 316) for any suitable number of cloud computing users. Volume blocks corresponding to the file may be previously store within block storage 316.

At step 5, block copy engine 312 may request the volume blocks corresponding to the volume identifier to block volume service 314. Block volume service 314 may retrieve the volume blocks from block storage 316 at step 6 and send the blocks to block copy engine 312 at step 7. As depicted at 317, each volume block (corresponding to a volume block identifier) may be associated with any suitable number of shards which are identifiable by corresponding shard identifiers. The block volume service 314 may be configured to maintain, as part of managing block storage 316, a mapping (e.g., mapping 319) between the volume block identifier corresponding to the volume block and the shards identifiers corresponding to that volume block identifier. Each shard associated with each of the shard identifiers may store a portion of the volume block. Multiple shards may store overlapping volume block data and may be distributed on different computing devices associated with the block storage 316 for redundancy purposes. In some embodiments, the various shards and shard identifiers for the volume block identifiers requested by the block copy engine 312 may be obtained by block volume service 314 from mapping 219 and returned to block copy engine 312 along with the volume blocks provided at step 7.

At step 8, block copy engine 312 may store the obtained volume blocks with object storage 318. Object storage 318 may be managed by the same or a different cloud computing service within the cloud computing environment. Object storage 318 may include objects of any suitable number of cloud computing users, compartments, and/or tenancies. A portion of object storage 318 that stores the volume blocks retrieved from block storage 316 may be referred to as "archive storage".

At step 9, block copy engine 312 may send the volume blocks (or locations or identifiers corresponding to the volume blocks and/or associated shards) back to backup engine 308. The data sent from the block copy engine 312 can therefore include the index metadata 206 of FIG. 2. The backup engine 308 may store the received index metadata corresponding to the volume blocks and/or shards in file data store 310 as part of the indexing data that included file index data 306.

In some embodiments, the block copy engine 312 may execute and/or initiate a deduplication process (e.g., performed by the deduplication engine 320) prior to storing the volume blocks in object storage 318. The deduplication engine 320 may operate as part of block copy engine 312, backup engine 104 of FIG. 1, or a backup process of the backup process(es) 124 of FIG. 1. The deduplication engine 320 may execute any suitable operations for generating signature data 322 which identifies unique chunks of data from the volume blocks. Using the signature data 322, the deduplication engine 320 may detect data replication within the volume blocks (e.g., by identifying two or more matching signatures) and eliminating duplicate copies of identical data within the volume blocks prior to storing the volume blocks with object storage 318. By detecting such data repetition and storing identical data only once within object storage 318, the deduplication engine 320 can minimize storage space utilized to store the volume blocks.

Figure 4:
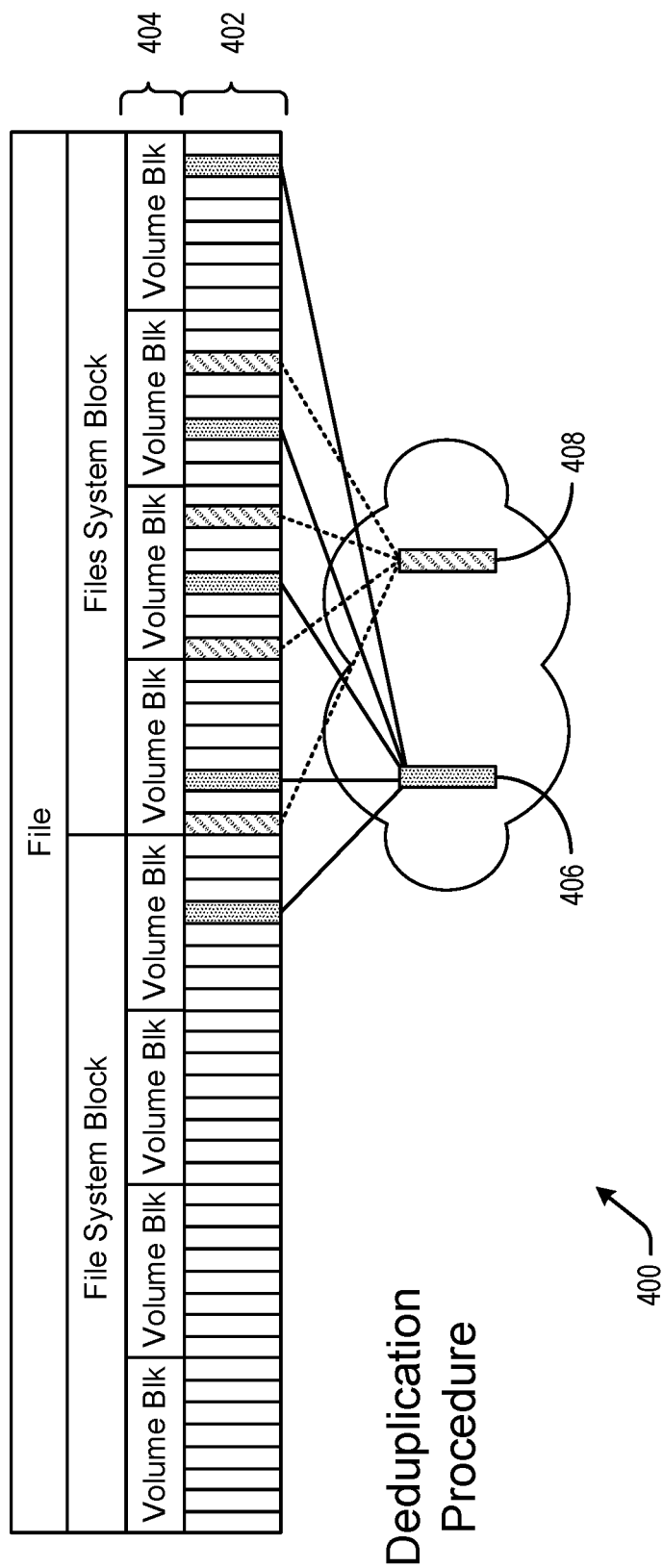
FIG. 4 illustrates a flow of an example method for executing a deduplication procedure, in accordance with at least one embodiment.

FIG. 4 illustrates a flow of an example method 400 for executing a deduplication procedure, in accordance with at least one embodiment. The method 400 may be performed by the deduplication engine 320 of FIG. 3 or by any suitable computing component discussed in connection with FIG. 1 (e.g., the backup engine 104, the backup process(es) 124, etc.). The method may include generating signature data identifying unique chunks of data from the volume blocks obtained from block storage in the manner discussed above in connection with FIG. 3. As a non-limiting example, a signature may be generated for each of the shards 402 corresponding to each of the volume blocks (e.g., volume blocks 404) requested at step 5 of FIG. 3.

The signatures of each shard may be compared to one another to identify duplicates (e.g., duplicates of signature 406 and signature 408). Each instance of signature 406 depicted in shards 402 indicates an identical copy of data. Similarly, each instance of signature 408 depicted in shards 402 indicates an identical copy of data. Only one shard corresponding to signature 406 may be retained for archival storage (e.g., in object storage 318 of FIG. 3 as described at step 8 of FIG. 3), while duplicate instances of signature 406 may be deleted. Similarly, a single shard corresponding to signature 408 may be retained for archival storage, while duplicate instance of signature 408 may be deleted.

Figure 5:
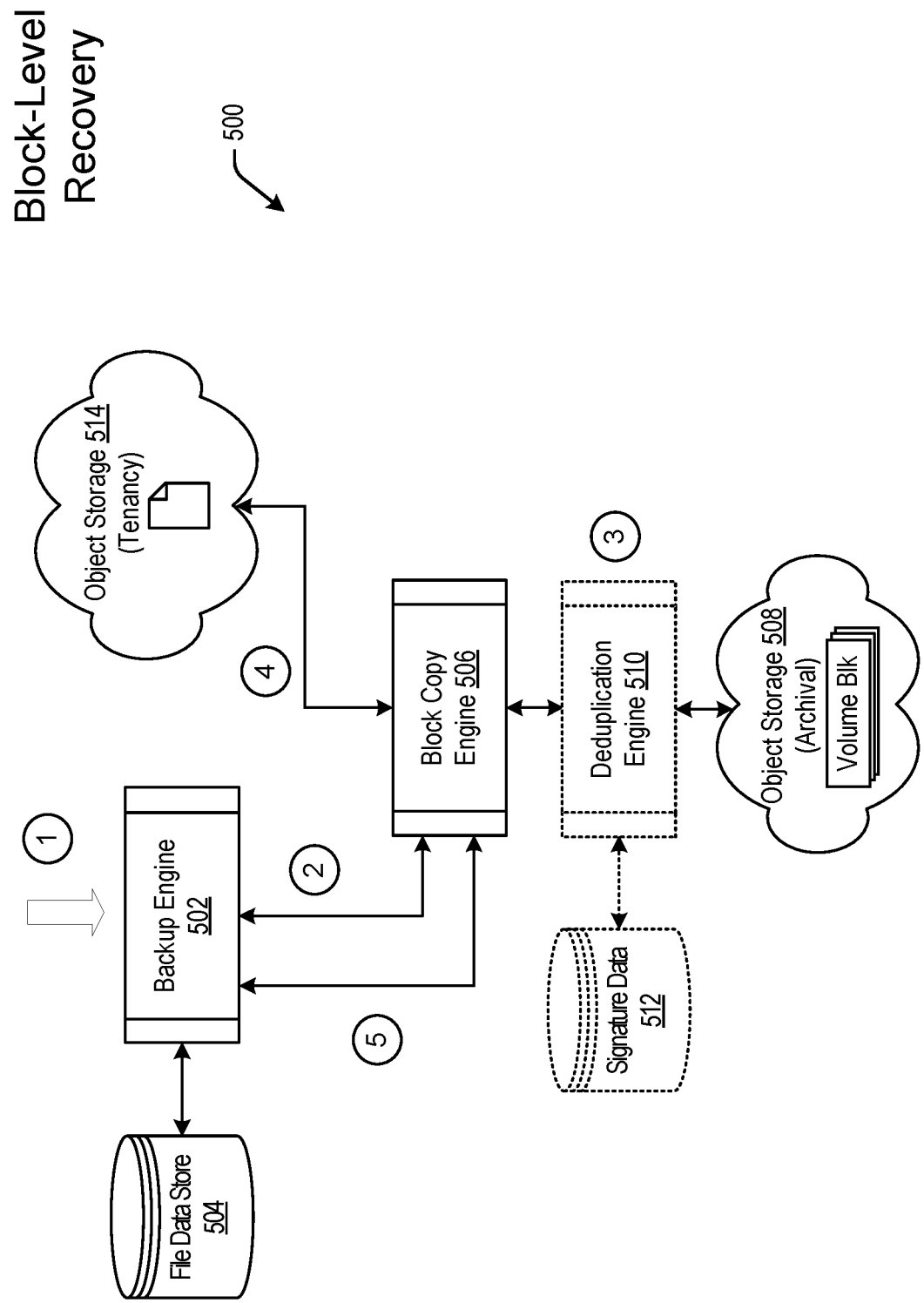
FIG. 5 illustrates a flow of an example method for executing a block-level recovery, in accordance with at least one embodiment.

FIG. 5 illustrates a flow of an example method 500 for executing a block-level recovery, in accordance with at least one embodiment. In some embodiments, the procedure for block-level backup according to FIG. 3 may have been previously executed such that index metadata (e.g., index metadata 200 of FIG. 2) corresponding to one or more volumes of a consistency group has been already generated and stored in file data store 504 (an example of the file data stores 310 and 140 of FIGS. 3 and 1, respectively).

At step 1, index metadata (e.g., index metadata 200 of FIG. 2 corresponding to backup data 124 and backup data 126 of FIG. 1) may be passed to backup engine 402 (an example of backup engine 104 of FIG. 1 and/or backup engine 310 of FIG. 3). In some embodiments, the index metadata may be presented to a user via any suitable user interface hosted by the backup engine 502 and/or by a service or other computing component that is configured to host one or more user interfaces for viewing and/or selecting data from file data store 140 of FIG. 1. As a non-limiting example, a user may utilize the user interface(s) to select any suitable portion of the index metadata (e.g., one or more files, one or more file system blocks, one or more volume blocks, one or more shards, or any suitable combination of the above) to indicate particular data the user wants to recover. Providing access to the index metadata via these user interface(s) enables the user to select backup restores of a variety of granularities previously unavailable in conventional data recovery approaches. Using the disclosed techniques, the user can recovery data from a file level, a file system block level, a volume block level, and/or a shard level depending on the user's needs. The selected index metadata is passed to the backup engine 502 at step 1.

At step 2, the backup engine 502 may obtain any corresponding index metadata from file data store 504 which corresponds to the index metadata received at step 1. By way of example, if one or more files were selected and provided to backup engine 502, backup engine 502 may retrieve the file system block identifiers, volume block identifiers, and shard identifiers corresponding to those selected files. Similarly, if one or more volume block identifiers were provided at step 1, backup engine 502 may retrieve from file data store 504, the file identifiers (e.g., paths), file system block identifiers, and shard identifiers corresponding to the selected volume blocks received at step 1. The received and/or obtained index metadata may be provided to block copy engine 506. Block copy engine 506 may operate as part of backup engine 502 wholly, or in part, or block copy engine 506 may operate wholly, or in part, as a computing component separate from the backup engine 502.

At step 3, block copy engine 506 may retrieve the requested data from archival storage (e.g., object storage 508, an example of the object storage 318 of FIG. 3). In some embodiments, the retrieval process performed by the block copy engine 506 may include utilizing a deduplication process executed by the deduplication engine 510 (an example of the deduplication engine 320 of FIG. 3) to reconstruct the requested data from single instances of data store in object storage 508. As a non-limiting example, the deduplication engine 510 may identify signatures (e.g., from signature data 512, an example of signature data 322 of FIG. 3) corresponding to particular data retrieved from object storage 508 and may reconstruct the requested data, which potentially includes multiple instances of the data corresponding to a given signature. By way of example, if the user requested recovery of the file depicted in FIG. 4, instances of signature 406 within shards 402 may be reconstructed from a single shard stored in object store 508.

At step 4, the data retrieved and/or reconstructed from the object storage 508 may be provided to a portion of object storage associated with and/or dedicated to the user. By way of example, the retrieved/reconstructed data may be copied from a portion of object storage associated with archival storage (e.g., object storage 508) to a portion of object storage that is associated with the user's tenancy (e.g., object storage 514). In some embodiments, object storage 508 and object storage 514 may be separate and distinct portions of a common object storage of a cloud computing environment.

At step 5, backup engine 502 is notified of the status of the recovery (e.g., success, failure, error code, etc.). The status and storage locations of the data recovered to the object storage 514 may be provided by the backup engine 502 via various user interfaces (directly, or through another computing component configured to host those user interfaces). In some embodiments, the user may access the recovered data via the user interface(s) via any suitable option presented at the user interface(s).

The method 500 may be performed any suitable number of times to add to the data recovered to object storage 514.

Figure 6:
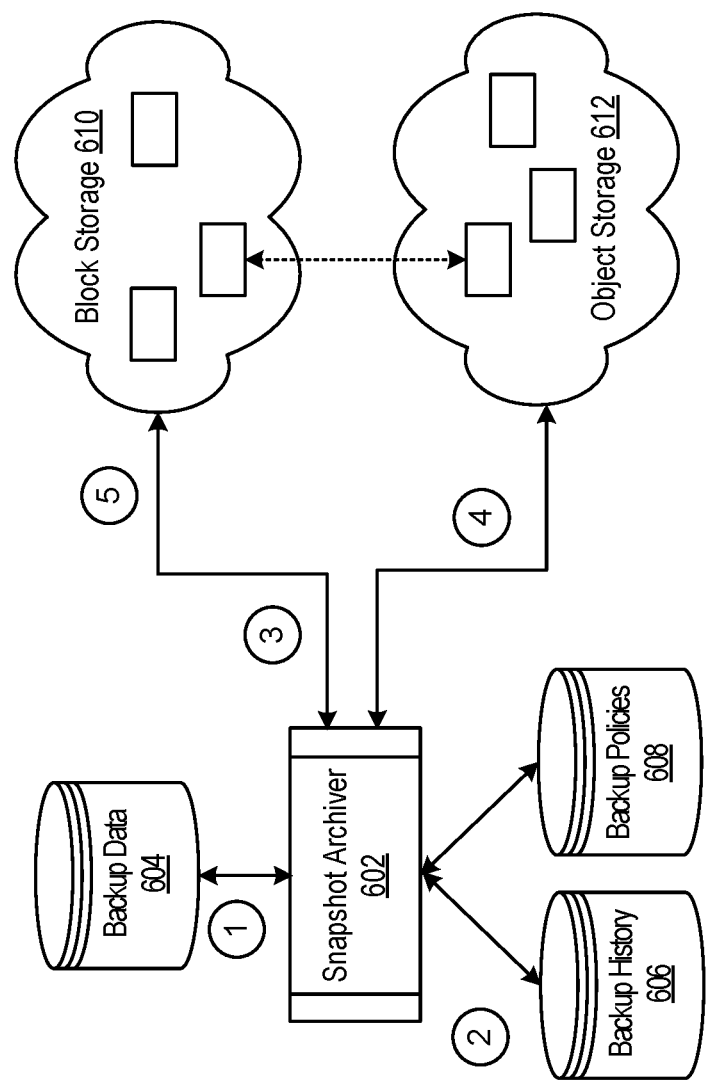
FIG. 6 illustrates a flow of an example method for executing an archive procedure, in accordance with at least one embodiment.

FIG. 6 illustrates a flow of an example method 600 for executing an archive procedure, in accordance with at least one embodiment. The method 600 may be performed by a snapshot archiver 602. The snapshot archiver 602 may be a computing component configured to manage archiving operations related to previously stored backups (e.g., snapshots). In some embodiments, the operations described with respect to the snapshot archiver 602 may be performed, in whole or in part, by the backup engine 104 of FIG. 1.

At step 1, snapshot archiver 602 may retrieve backup data 604 (an example of the backup data 142 of FIG. 1). In some embodiments, the backup data 604 may indicate an instance identifier, a consistency group identifier, a consistency group backup identifier (identifying a particular snapshot of the consistency group), one or more volume identifiers corresponding to volumes of the consistency group, index metadata mapping files, file system blocks, volume blocks, and shards of the data store in the volumes of the consistency group, or any suitable data associated with an instance, a consistency group, or one or more volumes of a consistency group. Although a consistency group may correspond to a single instance, in some embodiments, the user may define a consistency group that corresponds to multiple instances.

At step 2, the snapshot archiver 602 may obtain backup history 606 and backup policies 608 (examples of backup history 116 and backup policies 118 of FIG. 1). Snapshot archiver 602 may utilize any suitable rules associated with a backup policy (e.g., a daily backup policy) to identify whether a snapshot (e.g., a snapshot including individual snapshots of each of the volumes of a consistency group) is valid or stale. The backup policy could utilize any suitable information such as snapshot age, size, or other constraints to identify situations in which the snapshot is valid or stale. If the snapshot is identified as stale according to the corresponding backup policy with which the backup was initially generated, the snapshot archiver may proceed to step 3. Alternatively, if the snapshot is identified as valid under the backup policy, the method 600 may cease.

At step 3, the snapshot archiver 602 may retrieve (using the block storage 610, an example of the block storage 316 of FIG. 3) any suitable number of shards within the blocks referenced and/or associated with by the snapshot may be identified. The block storage 610 may provide the shard upon request. In some embodiments, data may be obtained from the block storage 610 by a block volume service (e.g., the block volume service 314). Therefore, in some embodiments, the shards may be retrieved by the snapshot archiver 602 by requesting, from the block volume service, that the shards be retrieved from block storage 610.

At step 4, the snapshot archiver 602 may copy the shards and/or volumes obtained from the block volume service 610 to object storage 612.

At step 5, the snapshot archiver 602 may send a request and/or instructions to block volume service 610 that cause the service to delete all of the shards/blocks copied over to object storage 612 and store a list (e.g., a linked list or other data structure) indicating the locations at which each shard or block is located within object storage 612. In some embodiments, the list may include pointers that, when dereferenced, return the data corresponding to a given shard or volume.

Figure 7:
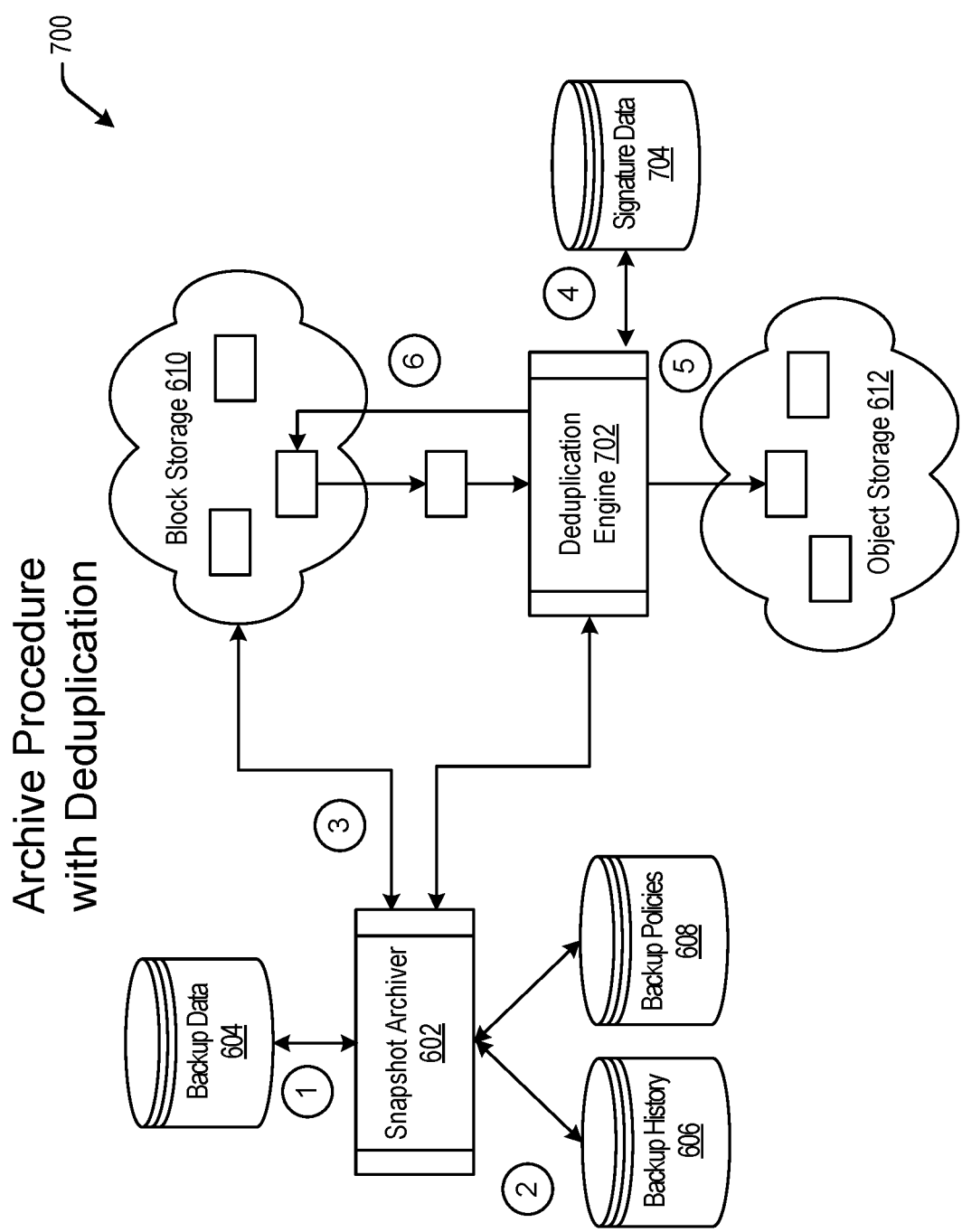
FIG. 7 illustrates a flow of an example method for executing an archive procedure with deduplication, in accordance with at least one embodiment.

FIG. 7 illustrates a flow of an example method 700 for executing an archive procedure with deduplication, in accordance with at least one embodiment. The method 700 is similar to method 600 but includes deduplication operations. The snapshot archiver 602 may utilize the backup data 604, backup history 606, and backup policies 608 as described above in connection with FIG. 6. Steps 1-3 of method 700 may be the same as steps 1-3 of method 600.

At step 4, snapshot archiver 602 may invoke the functionality of the deduplication engine 702 (e.g., by executing a function call to the deduplication engine 702, passing shard locations associated with the volume in block storage 612). In some embodiments, the deduplication engine 702 may calculate the signatures for the volume block. If a signature matches an existing signature (e.g., as determined from signature data 704 (an example of signature data 512 of FIG. 5), indicating that the data of the volume (corresponding to one or more shards) is already stored in object storage 610, the signature may be recorded in signature data 704 and a reference count corresponding to the signature may be incremented.

At step 5, if the signature is not detected by the deduplication engine 702 within the signature data 704, the data corresponding to the signature (e.g., the shard(s) associated with the volume) is written to object storage 610.

At step 6, the signature may be written to the index metadata associated with the volume and associated with any suitable number of shards and/or volumes that corresponds to an identical signature. All duplicate copies the data corresponding to the signature are deleted (e.g., from block storage 612), thereby ensuring that only one instance is stored at object storage 610 and/or block storage 612.

Figure 8:
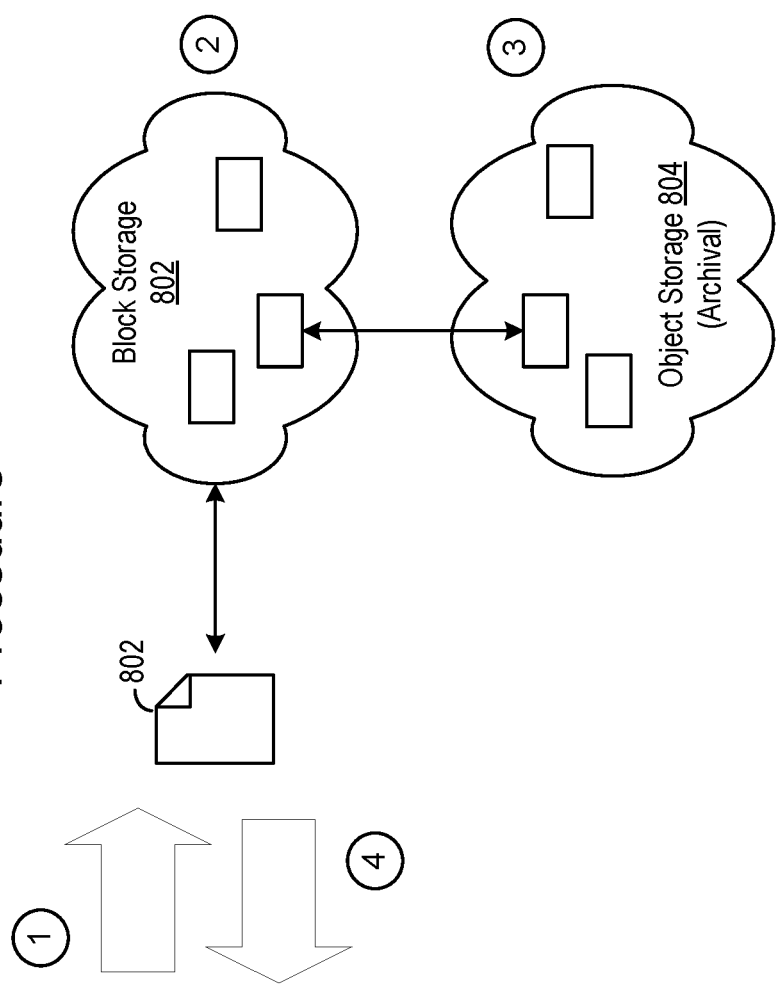
FIG. 8 illustrates a flow of an example method for executing an archive retrieval procedure, in accordance with at least one embodiment.

FIG. 8 illustrates a flow of an example method 800 for executing an archive retrieval procedure, in accordance with at least one embodiment.

At step 1, a request may be received by a block volume service (not depicted here, but an example of block volume service 314 of FIG. 3). The request may relate to utilizing a snapshot to create a volume for some use. By way of example, the request may relate to retrieving data corresponding to the volume(s) of a consistency group (e.g., consistency group 116 of FIG. 1) associated with a compute instance (e.g., the instance 110 of FIG. 1). The block volume service may be responsible for managing block storage 802 (e.g., an example of block storage 316 of FIG. 3). In some embodiments, the request may include request data 802. Request data 802 may include any suitable identifiers corresponding to a file (e.g., a file path name), a file system block, a volume block, or a shard. In some embodiments, the request may be initiated from any suitable user interface hosted by the backup engine 104 of FIG. 1 or any suitable component of a cloud computing environment. As a non-limiting example, the request may be received by the backup engine 104 via a user interface hosted by that computing component. The backup engine 104 may update the request with any suitable corresponding index metadata retrieved from backup data 142 of FIG. 1, and the request may be forwarded to the block volume service corresponding to block storage 802.

At step 2, the block volume service may utilize the request data 802 to identify locations within object storage 804 (an example of object storage 612 of FIG. 6) at which the requested data is stored. By way of example, the requested volume identifiers may be utilized to identify shard locations (e.g., from linked lists or other data structures stored in block storage 802 and indicating locations in object storage 804 corresponding to storage locations associated with one or more shards).

At step 3, the block volume service may copy shards from object storage 804 (from the locations identified at step 2) and reconstruct the volume blocks which are then stored in block storage 802.

At step 4, a response may be transmitted (e.g., by indicating the requested data was retrieved successfully or unsuccessfully. In some embodiments, the response may include any suitable data indicating any suitable portion of index metadata and/or locations associated with the retrieved data. In some embodiments, sending such data via this response may cause a user interface to provide viewing and/or editing access to the retrieved data within block storage 802.

Figure 9:
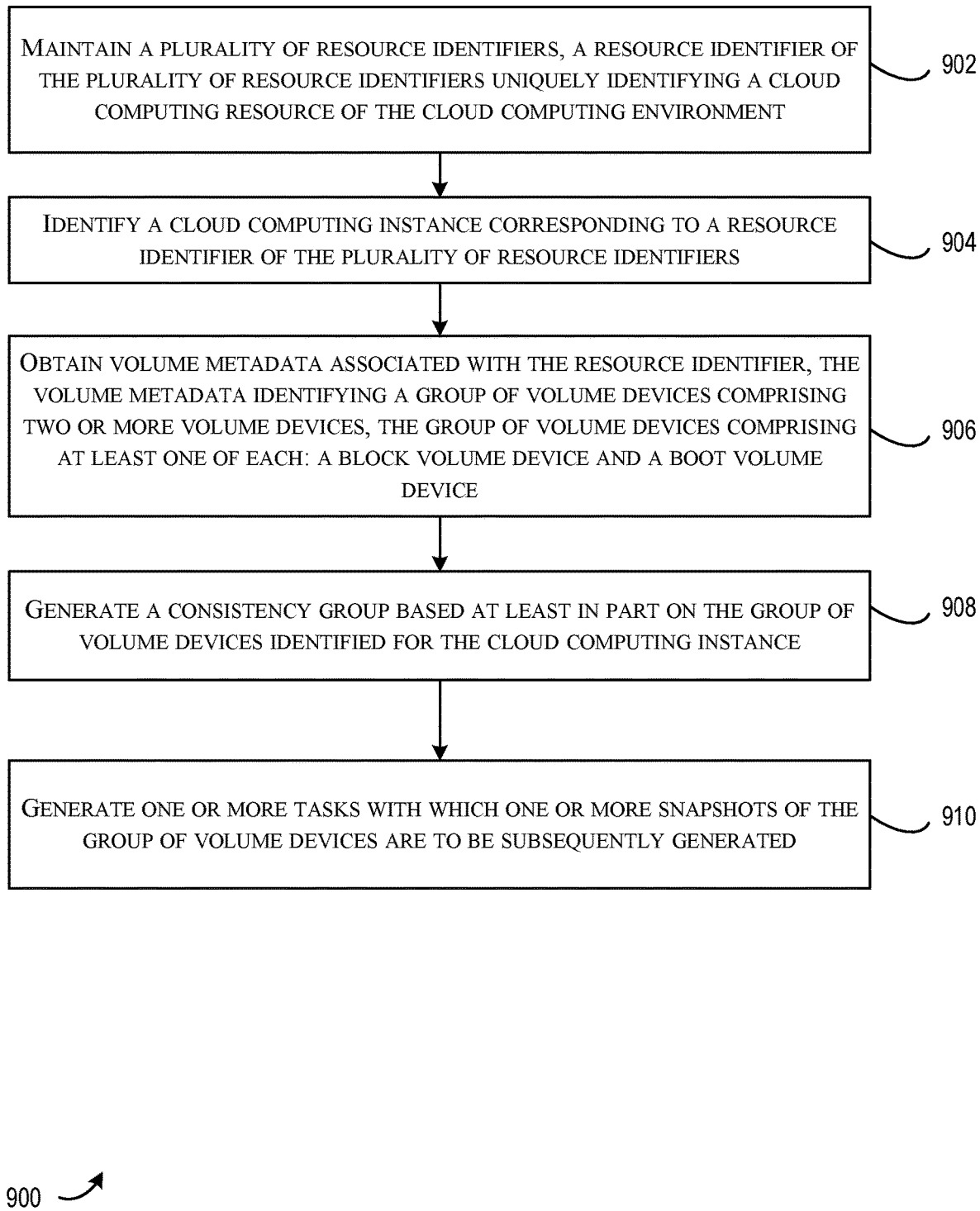
FIG. 9 is a block diagram illustrating an example method for managing backups within cloud-computing environments using consistency groups, in accordance with at least one embodiment.

FIG. 9 is a block diagram illustrating an example method 900 for managing backups within cloud-computing environments using consistency groups, in accordance with at least one embodiment. The operations of method 900 may be performed by any suitable combination of one or more computing components (e.g., the computing components of FIG. 1 such as the scanning engine 102, a backup engine 104, and the indexing engine 106, each a component of a backup service depicted by FIG. 1). The operations of method 900 may include more or fewer operations than those depicted in FIG. 9. The operations of method 900 may be performed in any suitable order.

At block 902, a plurality of resource identifiers may be maintained. In some embodiments, a resource identifier of the plurality of resource identifiers uniquely identifying a cloud computing resource of the cloud computing environment. By way of example, scanning engine 102 of FIG. 1 may maintain (e.g., as part of instance list(s) 132 or elsewhere) OCIDs of various resources such as compute instances, volumes, and the like.

At block 904, a cloud computing instance corresponding to a resource identifier of the plurality of resource identifiers may be identified. By way of example, the scanning engine 102 may identify at least one compute instance (e.g., instance 110 of FIG. 1) based at least in part on identifying at least one OCID that is associated with a resource type indicating the resource is a virtual machine instance.

At block 906, volume metadata associated with the resource identifier (e.g., instance metadata 111 of FIG. 1 and/or instance list(s) 132) may be obtained (e.g., by the scanning engine 102). In some embodiments, the volume metadata identifies a group of volume devices (e.g., boot volume 112 and block volume(s) 114) comprising two or more volume devices. In some embodiments, the group of volume devices comprising at least one of each: a block volume device and a boot volume device. The two or more volume devices may be volumes associated with a given instance (e.g., instance 110).

At block 908, a consistency group (e.g., consistency group 116) may be generated based at least in part on the group of volume devices identified for the cloud computing instance. In some embodiments, a consistency group identifier is generated for the consistency group and stores associations to the group of volume device identified for the cloud computing instance (e.g., instance 110).

At block 910, one or more tasks (e.g., backup work list(s) 122) may be generated (e.g., by the backup engine 104 of FIG. 1, a part of a backup service associated with the scanning engine 102). The tasks may be utilized to generate one or more snapshots of the group of volume devices. In some embodiments, generating the one or more tasks causes a second computing device (e.g., the backup engine 104, the backup process(es) 124 of FIG. 1) to generate at least one snapshot of the group of volume devices based at least in part on at least one schedule of the one or more schedules. The schedule(s) may be associated with backup policies related to a daily snapshot, a weekly snapshot, a monthly snapshot, and the like.

In some embodiments, the tasks may individually be associated with indexing the at least one snapshot of the group of volume devices based at least in part on executing an offline process and generating index metadata (e.g., index metadata 200) corresponding to the group of volume devices based at least in part on the indexing. In some embodiments, the index metadata for the group comprises at least one of: a file name, a full directory path corresponding to a file, a-time information, m-time information, c-time information, or a file size corresponding to a file stored on at least one of the group of volume devices. A-time information includes a value that indicates a time at which file was accessed (e.g., by a user or computing component). M-time information refers to a to a value indicating a time at which the contents of the file were changed. C-time information refers to a value indicating a time at which attributes of the file change such as ownership or permission data. 4. The computer-implemented method of claim 3, wherein indexing the at least one snapshot is performed by a computing agent installed within a tenancy of the cloud computing environment.

In some embodiments, indexing the at least one snapshot further comprises: mounting the at least one snapshot within a preconfigured computing instance; and scanning the file system of the at least one snapshot mounted within the preconfigured compute instance, the file metadata being generated based at least in part on the scanning. In some embodiments, the indexing may be performed by the indexing engine 106 (e.g., via indexing process(s) 130 of FIG. 1).

In some embodiments, generating the index metadata further comprises: generating an index mapping (e.g., mapping 319) for each volume device of the group of volume devices, the index mapping maintaining corresponding relationships between shards, block volumes, file system volumes, and files within a respective volume device of the group of volume devices; and associating the index mapping to at least one of the respective volume devices or the consistency group identifier.

Any suitable component (e.g., the backup engine 102 of FIG. 1) may provide a user interface presenting the index metadata, the user interface presenting a plurality of options corresponding to differing snapshot recovery scopes. In some embodiments, user input may be received via the user interface. The user input my correspond to a request to recover specific data from a specific snapshot (e.g., a request such as the request received at step 1 of method 800 described above in connection with FIG. 8. In some embodiments, the specific data being associated with a specific data scope (e.g., a file, a file system block, a volume block, a shard, etc.) of the differing snapshot recovery scopes. In some embodiments, the differing snapshot recovery scopes comprises at least two of: a file-level recovery scope, a shard-level recovery scope, a block-level recovery scope, or an instance-level recovery scope.

Example IaaS Environments

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
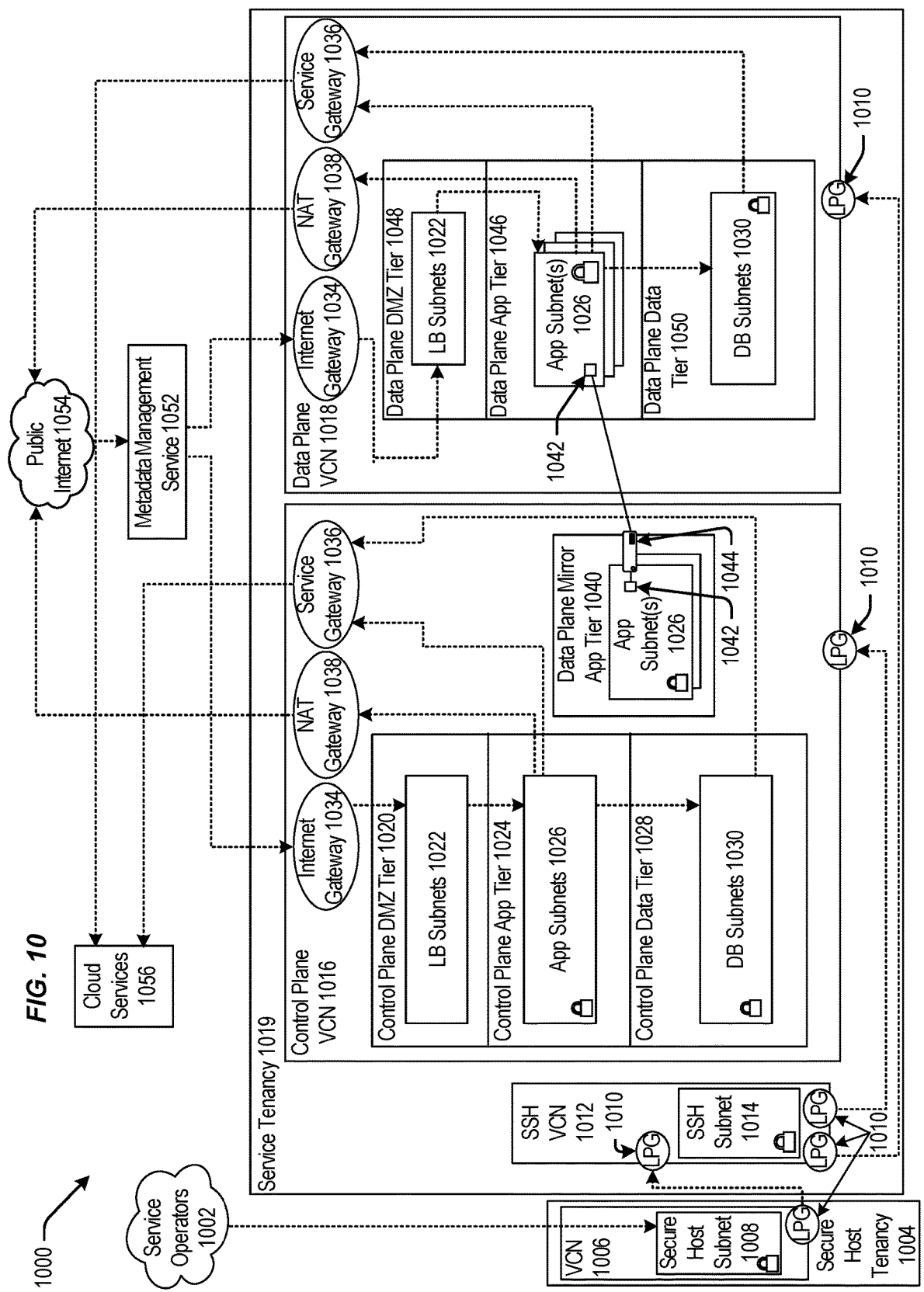
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Metadata that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of threat prevention, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
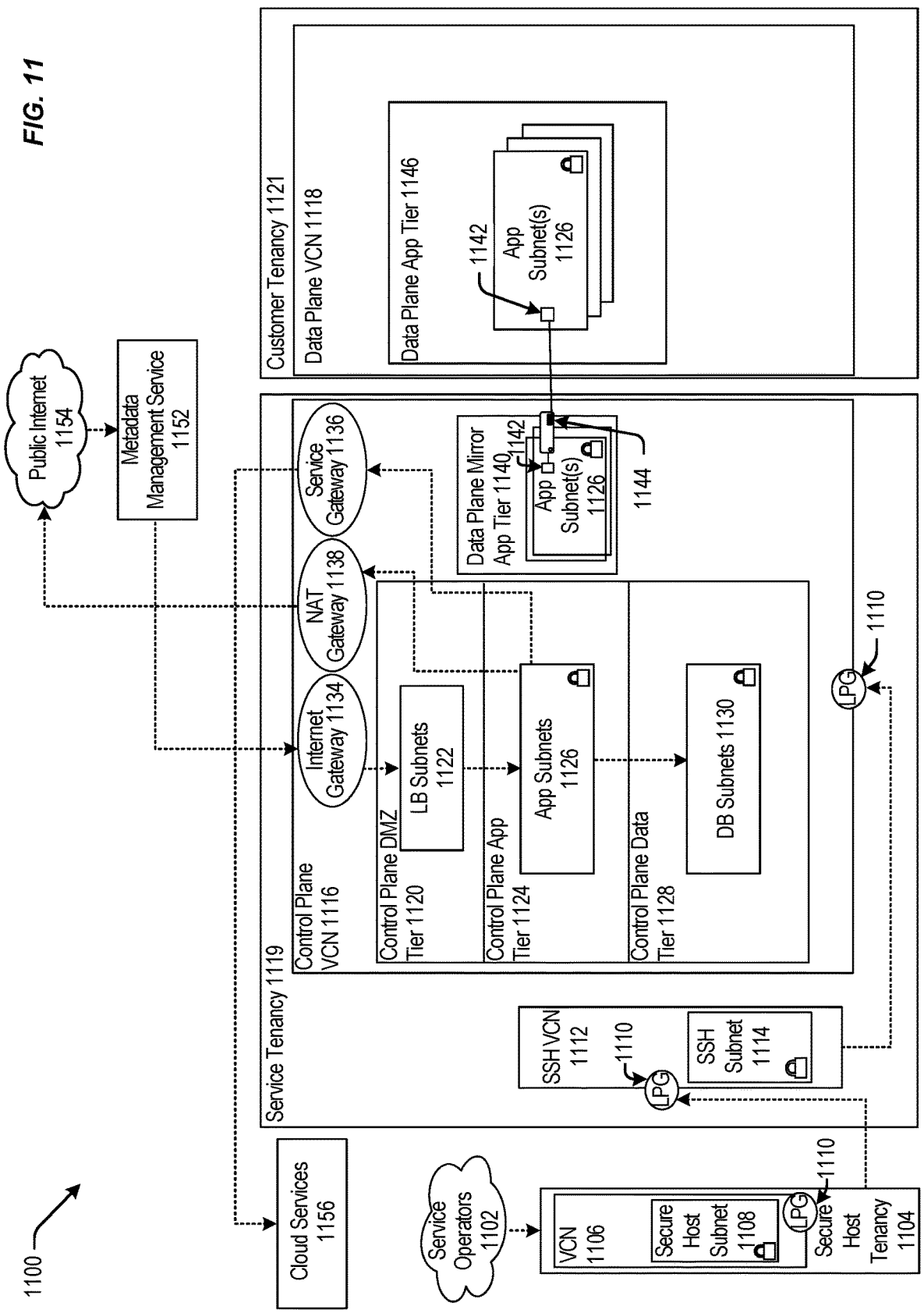
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 1002 of FIG. 10) can be communicatively coupled to a secure host tenancy 1104 (e.g., the secure host tenancy 1004 of FIG. 10) that can include a virtual cloud network (VCN) 1106 (e.g., the VCN 1006 of FIG. 10) and a secure host subnet 1108 (e.g., the secure host subnet 1008 of FIG. 10). The VCN 1106 can include a local peering gateway (LPG) 1110 (e.g., the LPG 1010 of FIG. 10) that can be communicatively coupled to a secure shell (SSH) VCN 1112 (e.g., the SSH VCN 1012 of FIG. 10) via an LPG 1010 contained in the SSH VCN 1112. The SSH VCN 1112 can include an SSH subnet 1114 (e.g., the SSH subnet 1014 of FIG. 10), and the SSH VCN 1112 can be communicatively coupled to a control plane VCN 1116 (e.g., the control plane VCN 1016 of FIG. 10) via an LPG 1110 contained in the control plane VCN 1116. The control plane VCN 1116 can be contained in a service tenancy 1119 (e.g., the service tenancy 1019 of FIG. 10), and the data plane VCN 1118 (e.g., the data plane VCN 1018 of FIG. 10) can be contained in a customer tenancy 1121 that may be owned or operated by users, or customers, of the system.

The control plane VCN 1116 can include a control plane DMZ tier 1120 (e.g., the control plane DMZ tier 1020 of FIG. 10) that can include LB subnet(s) 1122 (e.g., LB subnet(s) 1022 of FIG. 10), a control plane app tier 1124 (e.g., the control plane app tier 1024 of FIG. 10) that can include app subnet(s) 1126 (e.g., app subnet(s) 1026 of FIG. 10), a control plane data tier 1128 (e.g., the control plane data tier 1028 of FIG. 10) that can include database (DB) subnet(s) 1130 (e.g., similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g., the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g., the service gateway 1036 of FIG. 10) and a network address translation (NAT) gateway 1138 (e.g., the NAT gateway 1038 of FIG. 10). The control plane VCN 1116 can include the service gateway 1136 and the NAT gateway 1138.

The control plane VCN 1116 can include a data plane mirror app tier 1140 (e.g., the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g., the VNIC of 1042) that can execute a compute instance 1144 (e.g., similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g., the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g., the metadata management service 1052 of FIG. 10) that can be communicatively coupled to public Internet 1154 (e.g., public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g., cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
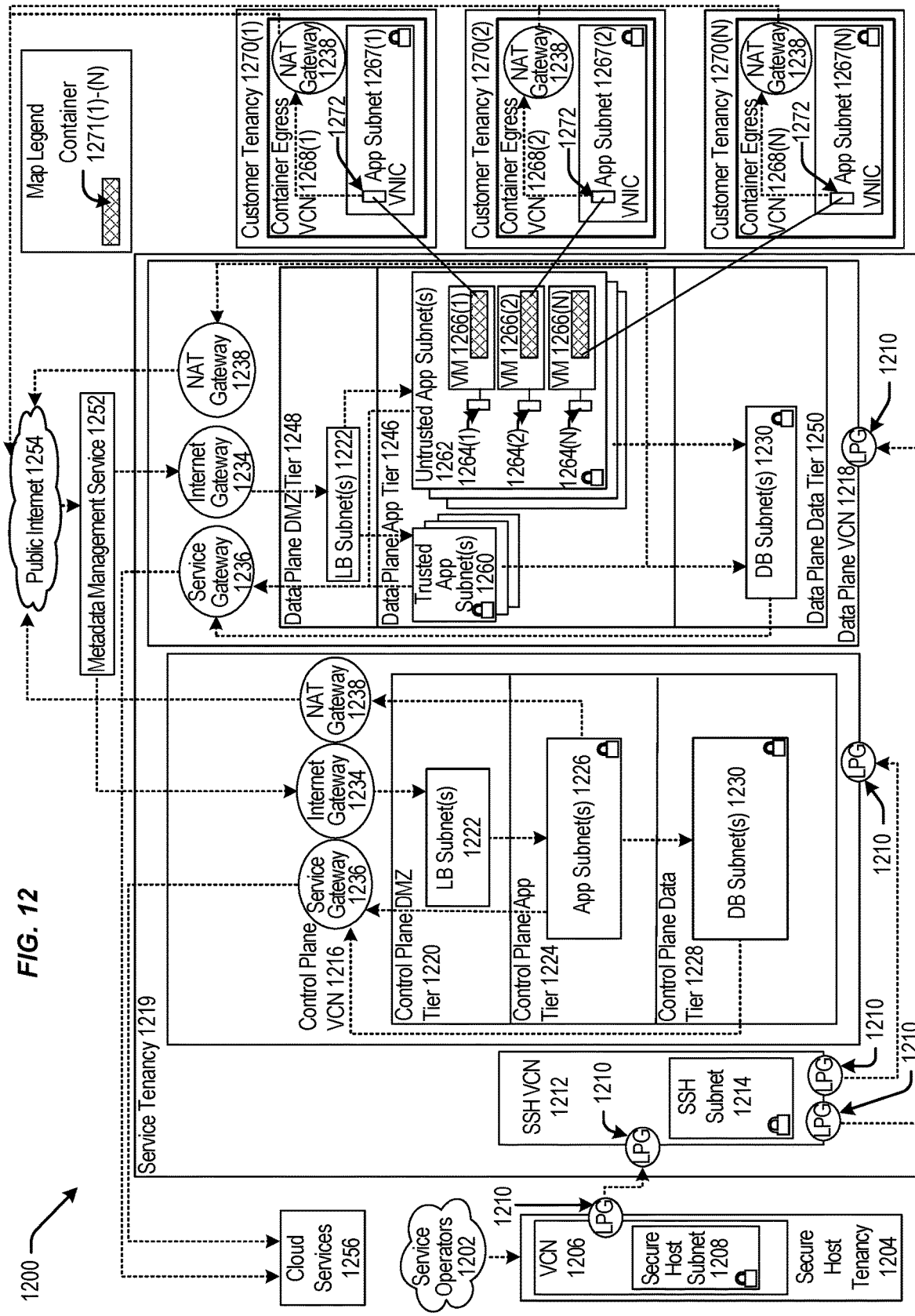
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1002 of FIG. 10) can be communicatively coupled to a secure host tenancy 1204 (e.g., the secure host tenancy 1004 of FIG. 10) that can include a virtual cloud network (VCN) 1206 (e.g., the VCN 1006 of FIG. 10) and a secure host subnet 1208 (e.g., the secure host subnet 1008 of FIG. 10). The VCN 1206 can include an LPG 1210 (e.g., the LPG 1010 of FIG. 10) that can be communicatively coupled to an SSH VCN 1212 (e.g., the SSH VCN 1012 of FIG. 10) via an LPG 1210 contained in the SSH VCN 1212. The SSH VCN 1212 can include an SSH subnet 1214 (e.g., the SSH subnet 1014 of FIG. 10), and the SSH VCN 1212 can be communicatively coupled to a control plane VCN 1216 (e.g., the control plane VCN 1016 of FIG. 10) via an LPG 1210 contained in the control plane VCN 1216 and to a data plane VCN 1218 (e.g., the data plane 1018 of FIG. 10) via an LPG 1210 contained in the data plane VCN 1218. The control plane VCN 1216 and the data plane VCN 1218 can be contained in a service tenancy 1219 (e.g., the service tenancy 1019 of FIG. 10).

The control plane VCN 1216 can include a control plane DMZ tier 1220 (e.g., the control plane DMZ tier 1020 of FIG. 10) that can include load balancer (LB) subnet(s) 1222 (e.g., LB subnet(s) 1022 of FIG. 10), a control plane app tier 1224 (e.g., the control plane app tier 1024 of FIG. 10) that can include app subnet(s) 1226 (e.g., similar to app subnet(s) 1026 of FIG. 10), a control plane data tier 1228 (e.g., the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 10) and a network address translation (NAT) gateway 1238 (e.g., the NAT gateway 1038 of FIG. 10). The control plane VCN 1216 can include the service gateway 1236 and the NAT gateway 1238.

The data plane VCN 1218 can include a data plane app tier 1246 (e.g., the data plane app tier 1046 of FIG. 10), a data plane DMZ tier 1248 (e.g., the data plane DMZ tier 1048 of FIG. 10), and a data plane data tier 1250 (e.g., the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g., public Internet 1054 of FIG. 10).

The Internet gateway 1234 contained in the control plane VCN 1216 and contained in the data plane VCN 1218 can be communicatively coupled to a metadata management service 1252 (e.g., the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
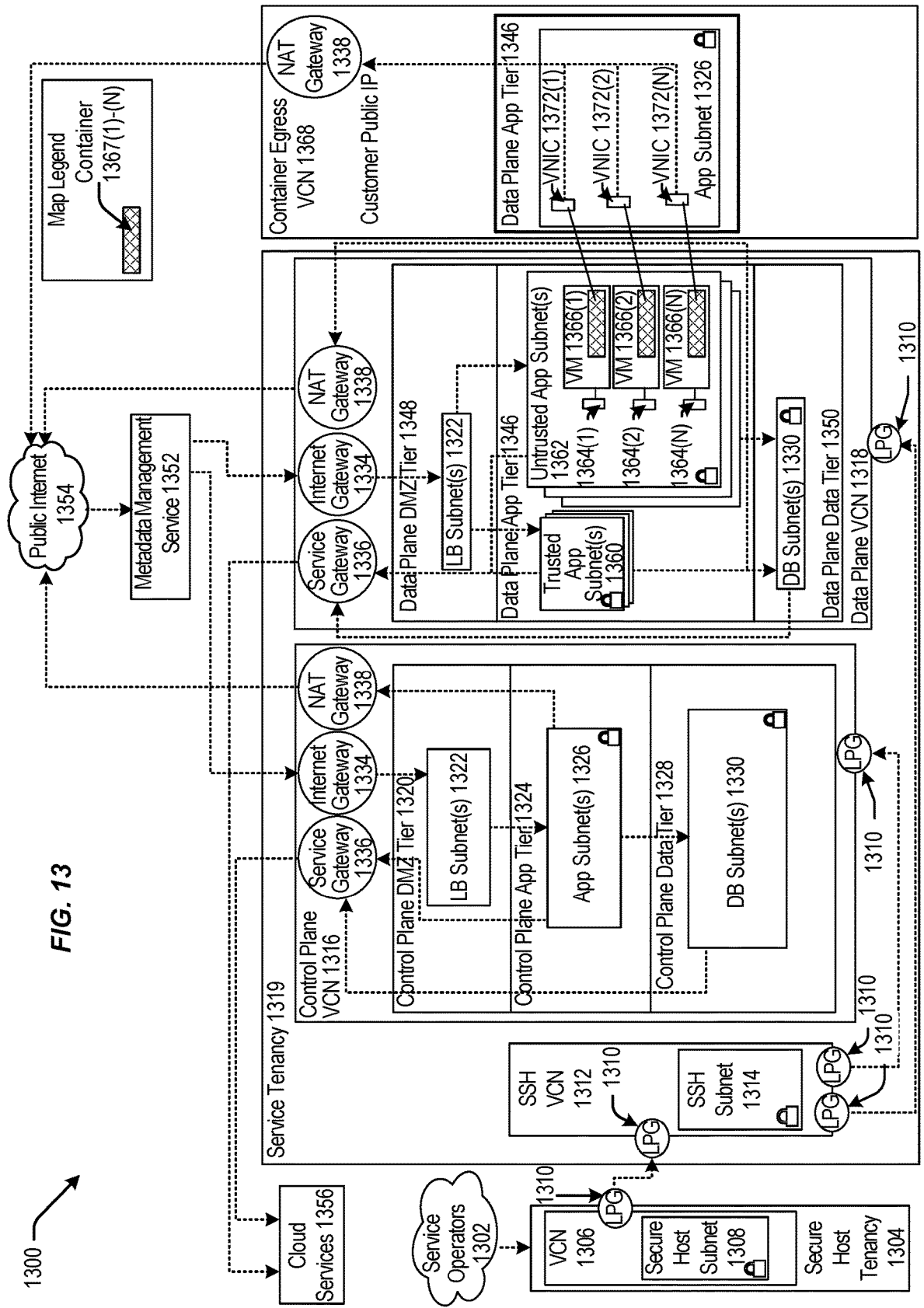
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1002 of FIG. 10) can be communicatively coupled to a secure host tenancy 1304 (e.g., the secure host tenancy 1004 of FIG. 10) that can include a virtual cloud network (VCN) 1306 (e.g., the VCN 1006 of FIG. 10) and a secure host subnet 1308 (e.g., the secure host subnet 1008 of FIG. 10). The VCN 1306 can include an LPG 1310 (e.g., the LPG 1010 of FIG. 10) that can be communicatively coupled to an SSH VCN 1312 (e.g., the SSH VCN 1012 of FIG. 10) via an LPG 1310 contained in the SSH VCN 1312. The SSH VCN 1312 can include an SSH subnet 1314 (e.g., the SSH subnet 1014 of FIG. 10), and the SSH VCN 1312 can be communicatively coupled to a control plane VCN 1316 (e.g., the control plane VCN 1016 of FIG. 10) via an LPG 1310 contained in the control plane VCN 1316 and to a data plane VCN 1318 (e.g., the data plane 1018 of FIG. 10) via an LPG 1310 contained in the data plane VCN 1318. The control plane VCN 1316 and the data plane VCN 1318 can be contained in a service tenancy 1319 (e.g., the service tenancy 1019 of FIG. 10).

The control plane VCN 1316 can include a control plane DMZ tier 1320 (e.g., the control plane DMZ tier 1020 of FIG. 10) that can include LB subnet(s) 1322 (e.g., LB subnet(s) 1022 of FIG. 10), a control plane app tier 1324 (e.g., the control plane app tier 1024 of FIG. 10) that can include app subnet(s) 1326 (e.g., app subnet(s) 1026 of FIG. 10), a control plane data tier 1328 (e.g., the control plane data tier 1028 of FIG. 10) that can include DB subnet(s) 1330 (e.g., DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 10) and a network address translation (NAT) gateway 1338 (e.g., the NAT gateway 1038 of FIG. 10). The control plane VCN 1316 can include the service gateway 1336 and the NAT gateway 1338.

The data plane VCN 1318 can include a data plane app tier 1346 (e.g., the data plane app tier 1046 of FIG. 10), a data plane DMZ tier 1348 (e.g., the data plane DMZ tier 1048 of FIG. 10), and a data plane data tier 1350 (e.g., the data plane data tier 1050 of FIG. 10). The data plane DMZ tier 1348 can include LB subnet(s) 1322 that can be communicatively coupled to trusted app subnet(s) 1360 (e.g., trusted app subnet(s) 1260 of FIG. 12) and untrusted app subnet(s) 1362 (e.g., untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N) and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g., public Internet 1054 of FIG. 10).

The Internet gateway 1334 contained in the control plane VCN 1316 and contained in the data plane VCN 1318 can be communicatively coupled to a metadata management service 1352 (e.g., the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
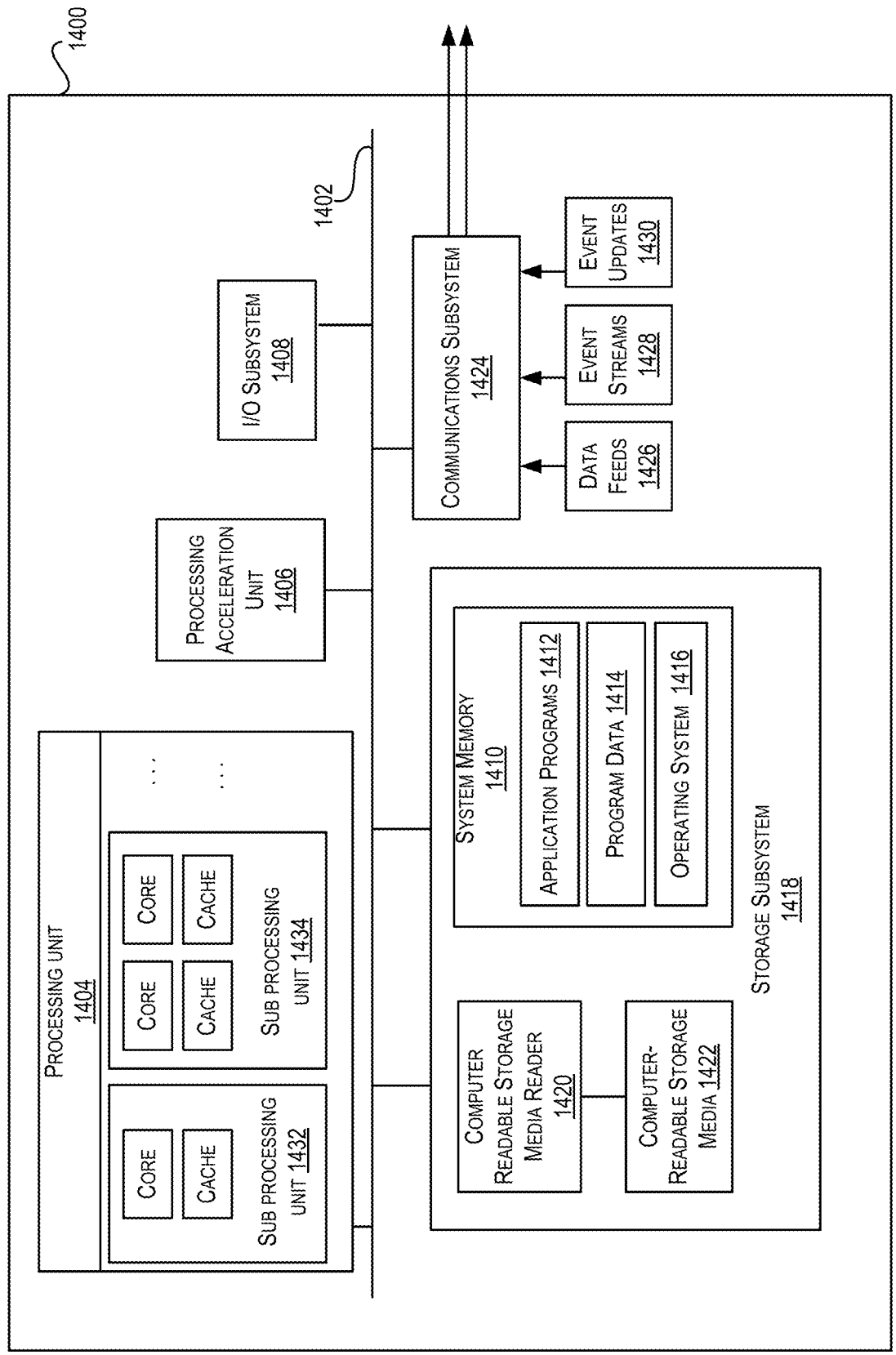
FIG. 14 is a block diagram illustrating an example computer system, according to at least one embodiment.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1404 provide the functionality described above. Storage subsystem 1418 may also provide a repository for storing data used in accordance with the present disclosure.

As depicted in the example in FIG. 14, storage subsystem 1418 can include various components including a system memory 1410, computer-readable storage media 1422, and a computer readable storage media reader 1420. System memory 1410 may store program instructions that are loadable and executable by processing unit 1404. System memory 1410 may also store data that is used during the execution of the instructions and/or data that is generated during the execution of the program instructions. Various different kinds of programs may be loaded into system memory 1410 including but not limited to client applications, Web browsers, mid-tier applications, relational database management systems (RDBMS), virtual machines, containers, etc.

System memory 1410 may also store an operating system 1416. Examples of operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1400 executes one or more virtual machines, the virtual machines along with their guest operating systems (GOSs) may be loaded into system memory 1410 and executed by one or more processors or cores of processing unit 1404.

System memory 1410 can come in different configurations depending upon the type of computer system 1400. For example, system memory 1410 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 1410 may include a basic input/output system (BIOS) containing basic routines that help to transfer information between elements within computer system 1400, such as during start-up.

Computer-readable storage media 1422 may represent remote, local, fixed, and/or removable storage devices plus storage media for temporarily and/or more permanently containing, storing, computer-readable information for use by computer system 1400 including instructions executable by processing unit 1404 of computer system 1400.

Computer-readable storage media 1422 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Machine-readable instructions executable by one or more processors or cores of processing unit 1404 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    maintaining, by a computing device of a cloud computing environment, a plurality of resource identifiers, a respective resource identifier of the plurality of resource identifiers uniquely identifying a cloud computing resource of the cloud computing environment;
    identifying a cloud computing instance corresponding to a resource identifier of the plurality of resource identifiers;
    obtaining, by the computing device, volume metadata associated with the resource identifier, the volume metadata identifying a set of volume devices comprising one or more volume devices associated with the cloud computing instance, the set of volume devices comprising at least one of: a block volume device or a boot volume device;
    generating, by the computing device, a consistency group based at least in part on the set of volume devices identified as being associated with the cloud computing instance;
    generating, by the computing device, one or more tasks with which one or more snapshots of the set of volume devices of the consistency group are subsequently generated; and
    indexing, as part of an offline process, at least one snapshot of the set of volume devices of the consistency group, the indexing comprising generating index metadata for the set of volume devices of the consistency group and associating the index metadata with the set of volume devices of the consistency group.

2. The computer-implemented method of claim 1, wherein generating the one or more tasks causes a second computing device to generate the at least one snapshot of the set of volume devices based at least in part on at least one schedule of the one or more schedules.

3. The computer-implemented method of claim 1, wherein the index metadata comprises at least one of: a file name, a full directory path corresponding to a file, a-time information, m-time information, c-time information, or a file size corresponding to a file that is stored on at least one of the set of volume devices.

4. The computer-implemented method of claim 1, wherein indexing the at least one snapshot is performed by a computing agent installed within a tenancy of the cloud computing environment.

5. The computer-implemented method of claim 1, wherein indexing the at least one snapshot further comprises:
    mounting the at least one snapshot within a preconfigured computing instance; and
    scanning a file system of the at least one snapshot mounted within the preconfigured compute instance, file metadata being generated based at least in part on the scanning.

6. The computer-implemented method of claim 1, wherein generating the index metadata further comprises:
    generating an index mapping for each volume device of the set of volume devices, the index mapping maintaining corresponding relationships between shards, block volumes, file system volumes, and files within a corresponding volume device of the set of volume devices; and
    associating the index mapping to at least one of the corresponding volume device or an identifier associated with the consistency group.

7. The computer-implemented method of claim 1, further comprising:
    providing a user interface presenting the index metadata, the user interface presenting a plurality of options corresponding to differing snapshot recovery scopes; and
    receiving, via the user interface, user input corresponding to a request to recover specific data from a specific snapshot, the specific data being associated with a specific data scope of the differing snapshot recovery scopes, the differing snapshot recovery scopes comprising at least two of: a file-level recovery scope, a shard-level recovery scope, a block-level recovery scope, or an instance-level recovery scope.

8. A computing service of a cloud computing environment, comprising:
    one or more processors; and
    one or more memories storing computer-executable instructions that, when executed with the one or more processors, cause the computing service to:
        maintain a plurality of resource identifiers, a respective resource identifier of the plurality of resource identifiers uniquely identifying a cloud computing resource of the cloud computing environment;
        identify a cloud computing instance corresponding to a resource identifier of the plurality of resource identifiers;

obtain volume metadata associated with the resource identifier, the volume metadata identifying a set of volume devices comprising one or more volume devices associated with the cloud computing instance, the set of volume devices comprising at least one of: a block volume device or a boot volume device;

generate a consistency group based at least in part on the set of volume devices identified for as being associated with the cloud computing instance;

generate one or more tasks with which one or more snapshots of the set of volume devices of the consistency group are subsequently generated; and index, as part of an offline process, at least one snapshot of the set of volume devices of the consistency group, the indexing comprising generating index metadata for the set of volume devices of the consistency group and associating the index metadata with the set of volume devices of the consistency group.

9. The computing service of claim 8, wherein generating the one or more tasks causes a second computing device to generate the at least one snapshot of the set of volume devices based at least in part on at least one schedule of the one or more schedules.

10. The computing service of claim 8, wherein
the index metadata comprises at least one of:
a file name, a full directory path corresponding to a file, a-time information, m-time information, c-time information, or a file size corresponding to a file that is stored on at least one of the set of volume devices.

11. The computing service of claim 8, wherein indexing the at least one snapshot is performed by a computing agent installed within a tenancy of the cloud computing environment.

12. The computing service of claim 8, wherein indexing the at least one snapshot further comprises:
mounting the at least one snapshot within a preconfigured computing instance; and
scanning a file system of the at least one snapshot mounted within the preconfigured computing instance, file metadata being generated based at least in part on the scanning.

13. The computing service of claim 8, wherein generating the index metadata further comprises:
generating an index mapping for each volume device of the set of volume devices, the index mapping maintaining corresponding relationships between shards, block volumes, file system volumes, and files within a corresponding volume device of the set of volume devices; and
associating the index mapping to at least one of the corresponding volume device or an identifier associated with the consistency group.

14. The computing service of claim 8, wherein executing the computer-executable instructions further causes the computing service to:
provide a user interface presenting the index metadata, the user interface presenting a plurality of options corresponding to differing snapshot recovery scopes; and
receive, via the user interface, user input corresponding to a request to recover specific data from a specific snapshot, the specific data being associated with a specific data scope of the differing snapshot recovery scopes, the differing snapshot recovery scopes comprising at least two of: a file-level recovery scope, a shard-level recovery scope, a block-level recovery scope, or an instance-level recovery scope.

15. A non-transitory computer-readable medium comprising executable instructions that, when executed with one or more processors of a service within a cloud computing environment cause the service to:
maintain a plurality of resource identifiers, a respective resource identifier of the plurality of resource identifiers uniquely identifying a cloud computing resource of the cloud computing environment;
identify a cloud computing instance corresponding to a resource identifier of the plurality of resource identifiers;
obtain volume metadata associated with the resource identifier, the volume metadata identifying a set of volume devices comprising one or more volume devices associated with the cloud computing instance, the set of volume devices comprising at least one of: a block volume device or a boot volume device;
generate a consistency group based at least in part on the set of volume devices identified for as being associated with the cloud computing instance;
generate one or more tasks with which one or more snapshots of the set of volume devices of the consistency group are subsequently generated; and
index, as part of an offline process, at least one snapshot of the set of volume devices of the consistency group, the indexing comprising generating index metadata for the set of volume devices of the consistency group and associating the index metadata with the set of volume devices of the consistency group.

16. The non-transitory computer-readable medium of claim 15, wherein generating the one or more tasks causes a second computing device to generate the at least one snapshot of the set of volume devices based at least in part on at least one schedule of the one or more schedules.

17. The non-transitory computer-readable medium of claim 15, wherein
the index metadata comprises at least one of: a file name, a full directory path corresponding to a file, a-time information, m-time information, c-time information, or a file size corresponding to a file that is stored on at least one of the set of volume devices.

18. The non-transitory computer-readable medium of claim 15, wherein indexing the at least one snapshot is performed by a computing agent installed within a tenancy of the cloud computing environment, and wherein indexing the at least one snapshot further comprises:
mounting the at least one snapshot within a preconfigured computing instance; and
scanning a file system of the at least one snapshot mounted within the preconfigured computing instance, the index metadata being generated based at least in part on the scanning.

19. The non-transitory computer-readable medium of claim 15, wherein generating the index metadata further comprises:
generating an index mapping for each volume device of the set of volume devices, the index mapping maintaining corresponding relationships between shards, block volumes, file system volumes, and files within a corresponding volume device of the set of volume devices; and
associating the index mapping to at least one of the corresponding volume device or an identifier associated with the consistency group.

20. The non-transitory computer-readable medium of claim 15, wherein executing the executable instructions further causes the service to:
- provide a user interface presenting the index metadata, the user interface presenting a plurality of options corresponding to differing snapshot recovery scopes; and
- receive, via the user interface, user input corresponding to a request to recover specific data from a specific snapshot, the specific data being associated with a specific data scope of the differing snapshot recovery scopes, the differing snapshot recovery scopes comprising at least two of: a file-level recovery scope, a shard-level recovery scope, a block-level recovery scope, or an instance-level recovery scope.

* * * * *

UNITED STATES PATENT AND TRADEMARK OFFICE
CERTIFICATE OF CORRECTION

Page 1 of 1

PATENT NO. : 12,197,790 B2
APPLICATION NO. : 18/166992
DATED : January 14, 2025
INVENTOR(S) : Nelson It is certified that error appears in the above-identified patent and that said Letters Patent is hereby corrected as shown below:

In the Claims

In Column 39, Line 9, in Claim 8, after "identified" delete "for".

In Column 40, Line 22, in Claim 15, after "identified" delete "for".

Signed and Sealed this
Eighth Day of April, 2025

Coke Morgan Stewart
*Acting Director of the United States Patent and Trademark Office*